United States Patent
Yamada et al.

(10) Patent No.: US 9,623,774 B2
(45) Date of Patent: Apr. 18, 2017

(54) SEAT RECLINING DEVICE FOR VEHICLES

(71) Applicant: AISIN SEIKI KABUSHIKI KAISHA, Kariya-shi (JP)

(72) Inventors: Yukifumi Yamada, Toyota (JP); Naoki Goto, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 19 days.

(21) Appl. No.: 14/776,918

(22) PCT Filed: Mar. 18, 2014

(86) PCT No.: PCT/JP2014/057343
§ 371 (c)(1),
(2) Date: Sep. 15, 2015

(87) PCT Pub. No.: WO2014/148491
PCT Pub. Date: Sep. 25, 2014

(65) Prior Publication Data
US 2016/0023577 A1    Jan. 28, 2016

(30) Foreign Application Priority Data

Mar. 22, 2013  (JP) ................................. 2013-059883
Mar. 22, 2013  (JP) ................................. 2013-059884

(51) Int. Cl.
*B60N 2/235*   (2006.01)
*B60N 2/22*    (2006.01)

(52) U.S. Cl.
CPC ......... *B60N 2/2358* (2013.01); *B60N 2/2227* (2013.01); *B60N 2205/50* (2013.01)

(58) Field of Classification Search
CPC ............................ B60N 2/2358; B60N 2/2356
See application file for complete search history.

(56) References Cited

U.S. PATENT DOCUMENTS 5,984,413 A * 11/1999 Baloche ............... B60N 2/2358
                                                    297/367 R
6,007,153 A * 12/1999 Benoit ................. B60N 2/2358
                                                    297/363
(Continued)

FOREIGN PATENT DOCUMENTS

JP          11 70027      3/1999
JP        2009 95432      5/2009
(Continued)

OTHER PUBLICATIONS

International Preliminary Report on Patentability and Written Opinion issued Sep. 22, 2015 in PCT/JP2014/057343 filed Mar. 18, 2014 (English translation only).
(Continued)

Primary Examiner — Timothy J Brindley
(74) Attorney, Agent, or Firm — Oblon, McClelland, Maier & Neustadt, L.L.P.

(57) ABSTRACT

A vehicle seat reclining device includes a lock mechanism. The lock mechanism includes first and second members, which are rotational relative each other, first pawls, and a cam, which moves the first pawls in the radial direction and unlocks or locks the same. The vehicle seat reclining device includes a memory ring, which integrally rotates with the first member or the second member through engagement, partial engagement, or disengagement from the first pawls, an engaging projection, which is located in an accommodating recess of the second member and protrudes radially inward, and a rotation permitting section located on the outer circumferential surface of the memory ring. When the rotation permitting section allows the engaging projection to move, relative rotation within a predetermined rotation range is permitted between the second member and the memory ring.

8 Claims, 19 Drawing Sheets

(56) References Cited

U.S. PATENT DOCUMENTS

| | | | | |
|---|---|---|---|---|
| 6,082,821 A * | 7/2000 | Baloche | ............... | B60N 2/2358 297/354.12 |
| 6,095,608 A | 8/2000 | Ganot et al. | | |
| 8,985,690 B2 * | 3/2015 | Yamada | ............... | B60N 2/2358 297/341 |
| 2008/0047106 A1 * | 2/2008 | Burckhard | ........... | B60N 2/2356 16/382 |
| 2008/0217980 A1 | 9/2008 | Zou et al. | | |
| 2009/0096269 A1 | 4/2009 | Kojima et al. | | |
| 2011/0193391 A1 * | 8/2011 | Mitsuhashi | .......... | B60N 2/2252 297/354.1 |
| 2011/0254338 A1 * | 10/2011 | Fisher, III | ............. | B60N 2/236 297/367 P |
| 2012/0242133 A1 * | 9/2012 | Jaudouin | ............. | B60N 2/2356 297/463.1 |
| 2013/0161995 A1 | 6/2013 | Yamada et al. | | |
| 2013/0187426 A1 * | 7/2013 | Nagura | ............... | B60N 2/2356 297/367 P |
| 2013/0320735 A1 * | 12/2013 | McCulloch | .......... | B60N 2/2358 297/362 |
| 2014/0125105 A1 | 5/2014 | Yamada et al. | | |
| 2014/0225411 A1 * | 8/2014 | Matt | ...................... | B60N 2/682 297/362 |
| 2014/0284983 A1 * | 9/2014 | Yamada | ................. | B60N 2/235 297/362 |
| 2014/0284984 A1 * | 9/2014 | Yamada | ............... | B60N 2/2356 297/366 |
| 2015/0246625 A1 * | 9/2015 | Leconte | ............... | B60N 2/2252 297/361.1 |
| 2016/0046212 A1 * | 2/2016 | Lehmann | ................. | B60N 2/22 297/354.12 |

FOREIGN PATENT DOCUMENTS

| | | |
|---|---|---|
| JP | 2012 143508 | 8/2012 |
| JP | 2013 1163 | 1/2013 |

OTHER PUBLICATIONS

International Search Report Issued Jun. 10, 2014 in PCT/JP14/057343 Filed Mar. 18, 2014.

* cited by examiner

Rearward Rotation ⇔ Forward Rotation

[Neutral Position]

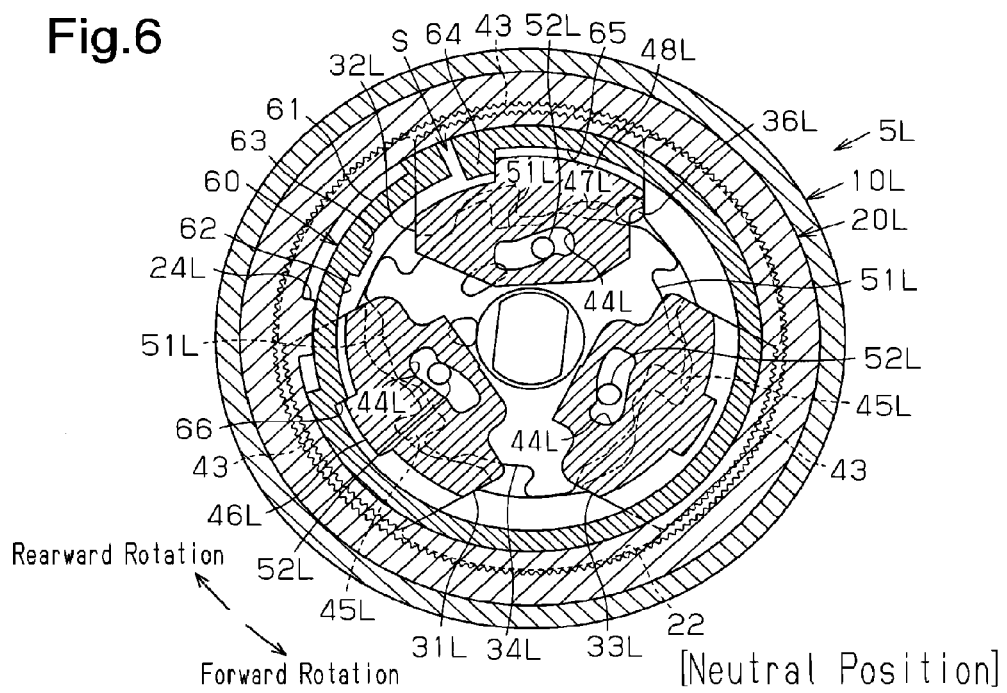
Fig.6 [Neutral Position]
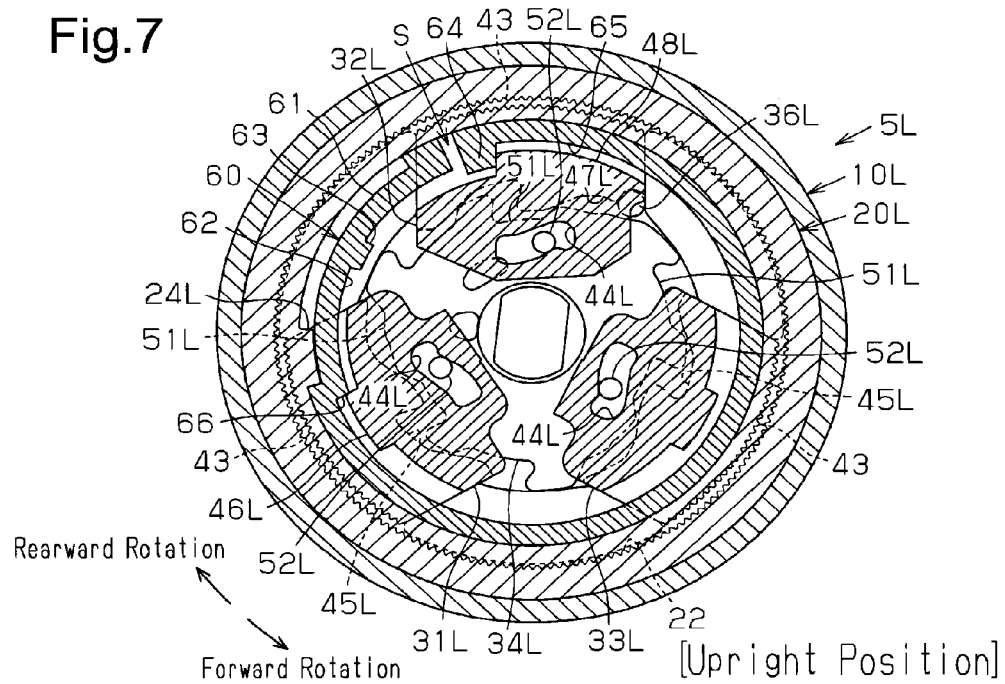
Fig.7 [Upright Position]

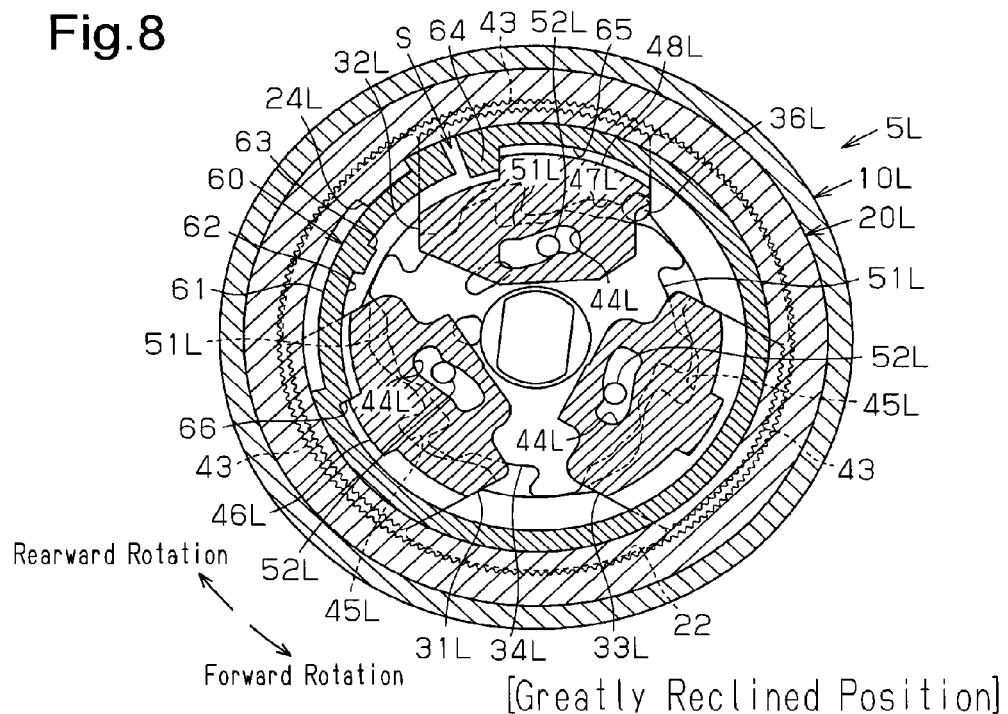
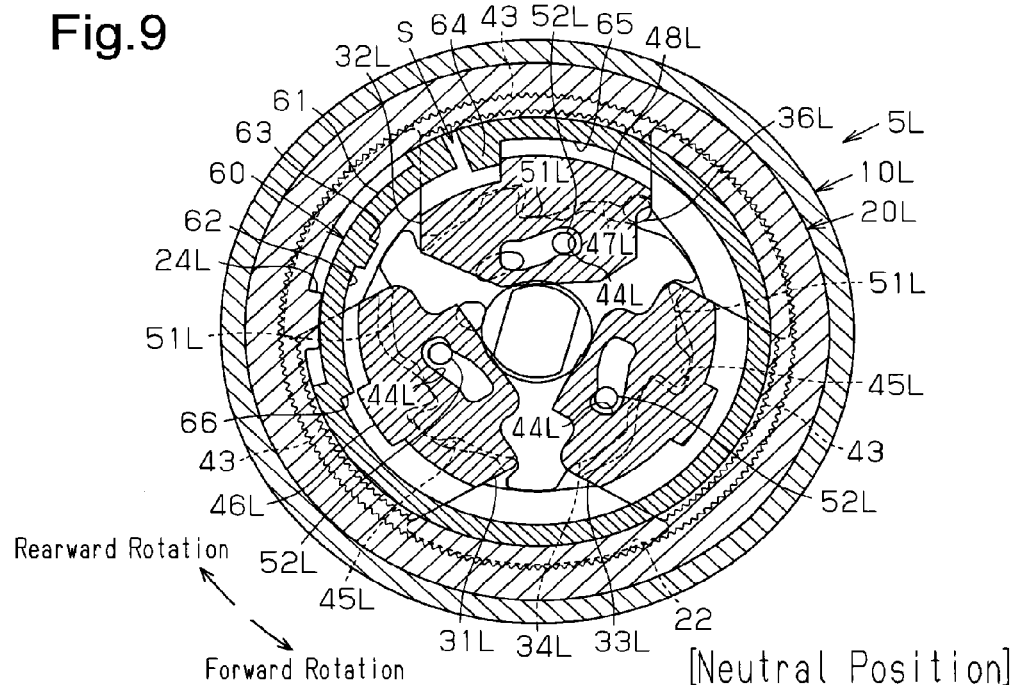

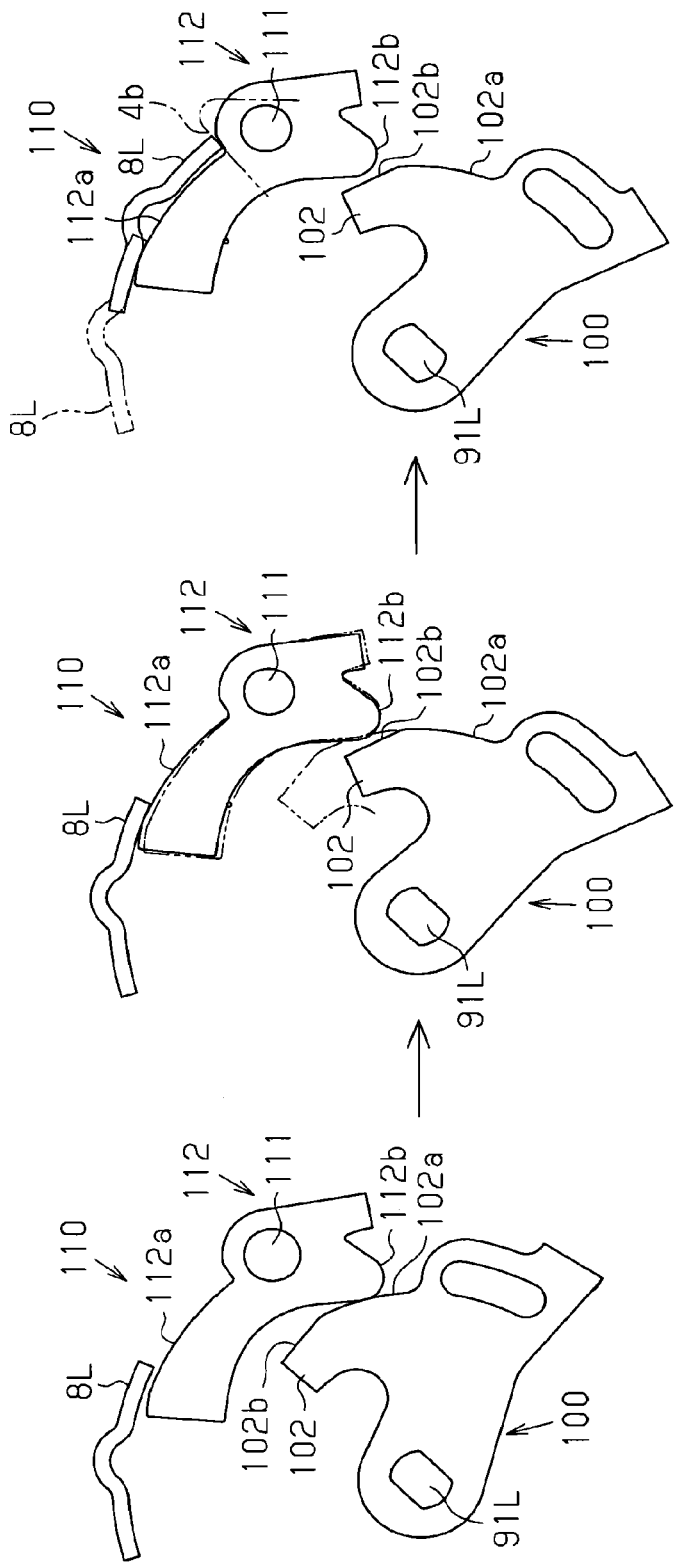

[Neutral Position]

Rearward Rotation
Forward Rotation

SEAT RECLINING DEVICE FOR VEHICLES

TECHNICAL FIELD

The present invention relates to a vehicle seat reclining device.

BACKGROUND ART

Conventionally, a device described in Patent Document 1, for example, is known as a vehicle seat reclining device. As shown in FIG. 26, a vehicle seat reclining device described in this document includes a lock mechanism 200. The lock mechanism 200 includes a first member 201 fixed to a seat cushion component, a second member 202 fixed to a seat back component and rotationally supported by the first member 201, a plurality of pawls 203, and a cam 204. The pawls 203 are guided by corresponding guide grooves 201a, which are located in the first member 201, to move in the radial direction. Each of the pawls 203 has outer teeth 203a, which are selectively meshed with and separated from inner teeth 202a, which are arranged in the second member 202. The cam 204 is rotationally provided in the first member 201. When the cam 204 is rotated in a certain direction and thus switched to a state of unlocking operation, the cam 204 retracts the pawls 203 radially inward to separate the outer teeth 203a from the inner teeth 202a. When the cam 204 is rotated in the opposite direction and thus switched to a state of locking operation, the cam 204 presses the pawls 203 radially outward to mesh the outer teeth 203a with the inner teeth 202a. The cam 204 is urged in the direction corresponding to the locking operation by an urging member (not shown) and rotated in the direction corresponding to the locking operation against the urging force of the urging member when a manipulating member (not shown) is switched to a state of unlocking manipulation.

A circular accommodating recess 202b, which is coaxial with the inner teeth 202a, is located in the second member 202. An annular memory ring 205, which has a discontinuous section, is rotationally arranged in the accommodating recess 202b in a contracted state. Pawl engaging projections 203b are provided in an adjacent pair of the pawls 203. The discontinuous section of the memory ring 205 is located between the pawl engaging projections 203b. The memory ring 205 has a pair of engagement portions 205a, 205b, which are arranged at positions adjacent to and between the pawl engaging projections 203b. The pawl engaging projections 203b are selectively engaged with and disengaged from the corresponding engagement portions 205a, 205b as the pawls 203 move radially.

When in a state of a first unlocking manipulation as an unlocking manipulation, the memory ring 205 is partially engaged in the radial direction with the pawl engaging projections 203b of the pawls 203, which are retracted radially inward, by means of the engagement portions 205a, 205b. The term "partial engagement (or engagement) in the radial direction" herein refers to a state in which the pawl engaging projections 203b of the pawls 203 are partially (or entirely) overlapped with the corresponding engagement portions 205a, 205b in the radial direction and thus interfere with the engagement portions 205a, 205b in the circumferential direction. This allows the memory ring 205 to rotate integrally with the first member 201 and relative to the second member 202.

In contrast, when in a state of a second unlocking manipulation as an unlocking manipulation, the engagement portion 205b of the memory ring 205 is disengaged in the radial direction from the pawl engaging projection 203b of the pawl 203, which is one of the pawls 203 that is retracted radially inward. This allows the memory ring 205 to rotate integrally with the second member 202 through friction engagement between the memory ring 205 and the second member 202 caused by elastic deformation of the memory ring 205 when, for example, the seat back is inclined forward.

At this time, the pawl engaging projection 203b of the corresponding pawl 203 is moved onto the engagement portion 205b to prohibit the outer teeth 203a of the pawls 203 from being meshed with the inner teeth 202a. That is, in the state of the second unlocking manipulation, the seat back, which is permitted to incline relative to the seat cushion, is inclined forward while being maintained in the state in which the seat back is permitted to incline relative to the seat back.

Then, the engagement portion 205b passes the pawl engaging projection 203b of the pawl 203, or, in other words, returns to the original angular position of the second unlocking manipulation (hereinafter, referred to as the "memory position"). This enables restriction of inclination of the seat back, which has been in the state permitted to incline. That is, by canceling forward inclination and returning the seat back, which has been inclined forward in the state of the second unlocking manipulation, to the memory position, inclination of the seat back becomes restricted.

A substantially arcuate engaging projection 202c projects radially inward from the second member 202. That is, as illustrated in FIG. 27, a circular recess 202d, which is coaxial with the inner teeth 202a and arranged radially inward from the inner teeth 202a, is located in the second member 202. The recess 202d is arranged such that at least a portion of the recess 202d is overlapped with the corresponding pawl engaging projection 203b at a position in the axial direction.

The engaging projection 202c projects from the inner circumferential surface of the recess 202d. As shown in FIG. 26, the engaging projection 202c is arranged such that the engaging projection 202c can be engaged in the radial direction with the pawl engaging projections 203b. When in the state of the first unlocking manipulation, the engaging projection 202c is partially engaged in the radial direction with the pawl engaging projection 203b of the corresponding pawl 203, which is retracted radially inward. The term "partial engagement (or engagement) in the radial direction" herein refers to a state in which the pawl engaging projection 203b of the pawl 203 is partially (or entirely) overlapped with the engaging projection 202c in the radial direction and thus interferes with the engaging projection 202c in a circumferential direction. This limits relative rotation of the first member 201 and the second member 202 to a predetermined relative rotation range at the end of which the engaging projection 202c contacts the corresponding pawl engaging projection 203b. Inclination of the seat back is thus limited to a predetermined angular range corresponding to the rotation range.

In the state of the second unlocking manipulation, the engaging projection 202c is disengaged in the radial direction from the pawl engaging projection 203b of the corresponding pawl 203, which is retracted radially inward. As a result, in the state of the second unlocking manipulation, the seal back can be inclined forward beyond the predetermined angular range.

PRIOR ART DOCUMENT

Patent Document

Patent Document 1: Japanese Laid-Open Patent Publication No. 2012-143508

SUMMARY OF THE INVENTION

Problems that the Invention is to Solve

As described in Patent Document 1, the engaging projection 202c of the second member 202 (the recess 202d), which is related to setting of the predetermined angular range of the seat back, is located offset from the axial position of the memory ring 205 (the accommodating recess 202b), as illustrated in FIG. 27. The engaging projection 202c and the memory ring 205 are thus arranged in the second member 202 independently from each other in the axial direction, enlarging the size in the axial direction.

Accordingly, it is an objective of the present invention to provide a vehicle seat reclining device that is compact in the axial direction.

Means for Solving the Problems

To achieve the foregoing objective and in accordance with one aspect of the present application, a vehicle seat reclining device including a lock mechanism is provided. The lock mechanism includes a first member, a second member, a first pawl, a cam, and an urging member. The first member is fixed to one of a seat cushion component and a seat back component and has a guide groove. The second member is fixed to the other one of the seat cushion component and the seat back component. The second member is rotationally supported by the first member and has inner teeth. The first pawl is guided by the guide groove of the first member to move in a radial direction and has outer teeth, which are selectively meshed with and separated from the inner teeth of the second member. The cam is rotationally arranged in the first member. When in a state of unlocking operation in which the cam is rotated in one direction, the cam retracts the first pawl inward in the radial direction to separate the outer teeth from the inner teeth. When in a state of locking operation in which the cam is rotated in another direction, the cam presses the first pawl outward in the radial direction to mesh the outer teeth with the inner teeth. The urging member urges the cam in a direction in which the locking operation is performed. The vehicle seat reclining device includes a manipulating member, a memory ring, an engaging projection, and a rotation permitting portion. The manipulating member rotates the cam in a direction in which the unlocking operation is performed against the urging force of the urging member when in a state of unlocking manipulation. The memory ring is rotationally arranged in an accommodating recess located in the second member to be coaxial with the inner teeth in an elastically contracted state. The memory ring has a first unlocking engaging surface located on an inner circumferential surface of the memory ring and a first locking engaging surface located on the inner circumferential surface to be adjacent to the first unlocking engaging surface in a circumferential direction. The first pawl has a first pawl engaging projection. The first unlocking engaging surface becomes engaged with the first pawl engaging projection to prohibit the outer teeth of the first pawl from being meshed with the inner teeth. The first locking engaging surface releases the first pawl engaging projection to allow the outer teeth of the first pawl to be meshed with the inner teeth. At a boundary position between the first unlocking engaging surface and the first locking engaging surface, the memory ring becomes partially engaged in a radial direction with the first pawl engaging projection of the first pawl, which is retracted radially inward when in a state of a first unlocking manipulation as the unlocking manipulation, thereby restricting the first pawl engaging projection from moving onto the first unlocking engaging surface from the first locking engaging surface. The memory ring rotates integrally with the first member and relative to the second member. The memory ring becomes disengaged in the radial direction from the first pawl engaging projection when in a state of a second unlocking manipulation as the unlocking manipulation, thereby permitting the first pawl engaging projection to move onto the first unlocking engaging surface from the first locking engaging surface. The memory ring rotates integrally with the second member with the first member and the second member maintained in a relative rotation state corresponding to a forward inclination of the seat back. The engaging projection is located in the accommodating recess of the second member to project inward in a radial direction. The rotation permitting portion is located on an outer circumferential surface of the memory ring. When the rotation permitting portion permits movement of the engaging projection, relative rotation of the second member and the memory ring is permitted in a predetermined rotation range.

BRIEF DESCRIPTION OF THE DRAWINGS

FIG. 6 is a cross-sectional view showing a state of a first unlocking operation of the lock mechanism at a neutral position;

FIG. 7 is a cross-sectional view showing a state of the first unlocking operation of the lock mechanism at an upright position;

FIG. 8 is a cross-sectional view showing a state of the first unlocking operation of the lock mechanism at a greatly reclined position;

FIG. 9 is a cross-sectional view showing a state of a second unlocking operation of the lock mechanism at the neutral position;

FIGS. 24A, 24B, and 24C are diagrams illustrating operation of the stopper mechanism when the seat back is in a non-seating range;

MODES FOR CARRYING OUT THE INVENTION

Figure 1:
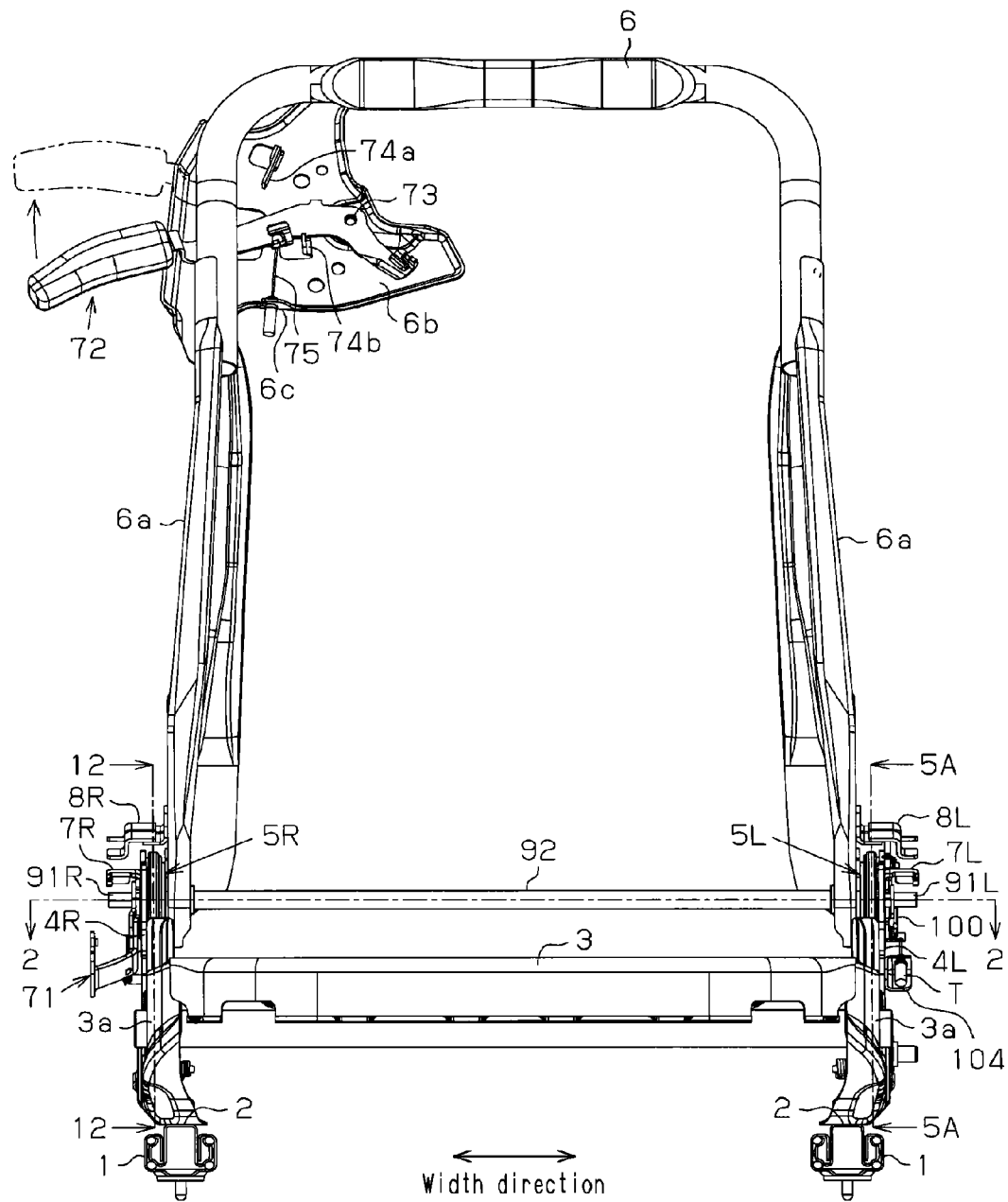
FIG. 1 is a front view showing a vehicle seat device according to one embodiment of the present invention.

As shown in FIGS. 1 to 24, a vehicle seat device including a walk-in mechanism will now be described. Hereinafter, the front-and-rear direction, the width direction, and the up-and-down direction coincide with the respective corresponding direction of the vehicle. Regarding some of the components arranged in pairs at opposite sides in the width direction, the reference numerals of the components located at the left and right as viewed in the forward direction of the vehicle may include "L" and "R," respectively.

As shown in FIG. 1, a pair of lower rails 1, which are arranged in parallel in the width direction while being extended in the front-and-rear direction (the direction perpendicular to the sheet surface of FIG. 1), are fixed to a vehicle floor (not shown). A pair of upper rails 2 is supported by the corresponding lower rails 1 each in a manner movable in the front-and-rear direction. The lower rails 1 and the upper rails 2 configure a seat slide mechanism. A slide lock device (not shown) selectively permits the upper rails 2 to move in the front-and-rear direction relative to the lower rails 1.

A cushion frame 3 shaped like a substantially rectangular frame, which configures the frame of a seat cushion, is mounted on the upper rails 2. In the cushion frame 3, a pair of lower plates 4L, 4R, which is provided by plates, is welded and fixed to outer side surfaces of rear end sections of a pair of cushion side frames 3a, which configure opposite side sections of the cushion frame 3 in the width direction. The lower plates 4L, 4R correspond to seat cushion components. A seat back frame 6 shaped like a substantially rectangular frame, which provides the frame of a seat back, is rotationally (for inclination) coupled to the lower plates 4L, 4R through a pair of lock mechanisms 5L, 5R. The lock mechanism 5L corresponds to a first lock mechanism arranged on one side in the width direction of a seat. The lock mechanism 5R corresponds to a second lock mechanism arranged on the opposite side in the width direction of the seat.

Figure 2:
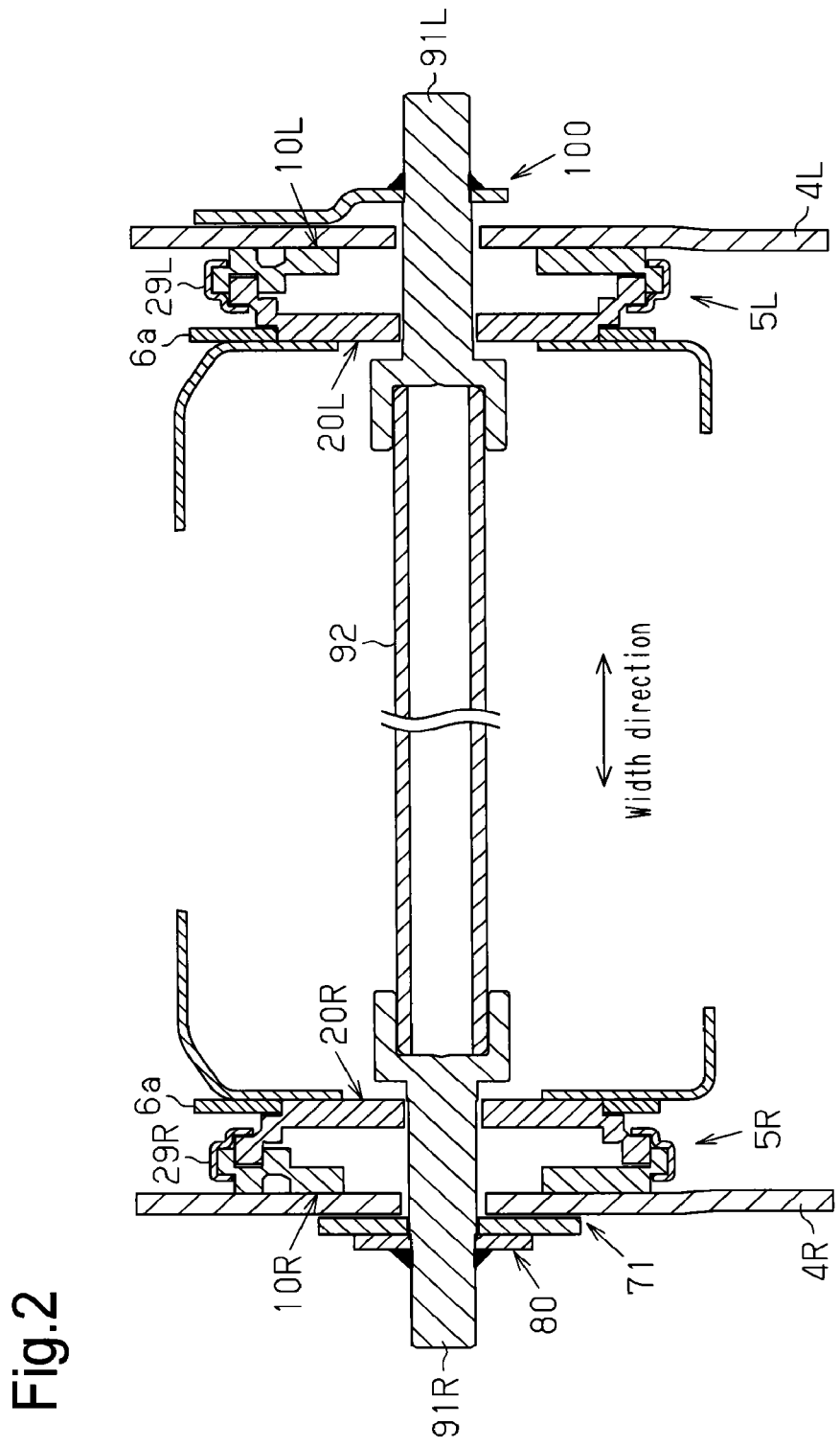
FIG. 2 is a cross-sectional view taken along line 2-2 of FIG. 1.

That is, the lower end sections of the two back side frames 6a, which configure the opposite side sections of the seat back frame 6 in the width direction, are arranged adjacent to the inner sides of the rear end sections (the lower plates 4L, 4R) of the respective cushion side frames 3a in the width direction. The back side frames 6a correspond to seat back components. Also as illustrated in FIG. 2, a pair of bar-shaped hinge shafts 91L, 91R, each of which has an axis extending in the width direction, extends through the lowed end sections of the corresponding back side frames 6a, together with the lower plates 4L, 4R. Each of the hinge shafts 91L, 91R rotationally supports the member (a second member 20L, 20R) of the corresponding one of the lock mechanisms 5L, 5R on the side corresponding to the back side frame 6a.

The hinge shafts 91L, 91R are fixed to a tubular coupling shaft 92, which extends in the width direction coaxially with the hinge shafts 91L, 91R, at the inner end sections of the hinge shafts 91L, 91R in the width direction, such that the hinge shafts 91L, 91R rotate integrally with the coupling shaft 92. That is, the hinge shafts 91L, 91R rotate cooperatively with each other through the coupling shaft 92. In the above-described manner, the seat back frame 6 is coupled to the lower plates 4L, 4R through the lock mechanisms 5L, 5R to be rotational about the axis of the coupling shaft 92. This enables adjustment of the angular position (the inclination angle) of the seat back relative to the seat cushion.

As shown in FIG. 1, fixed flanges 7L, 7R, which extend outward in the width direction at positions above the hinge shafts 91L, 91R, project from the lower plates 4L, 4R. Substantially L-shaped movable flanges 8L, 8R, which extend outward in the width direction at positions above the lower plates 4L, 4R and the fixed flanges 7L, 7R, are joined to the outer side surfaces of the corresponding back side frames 6a. An inner end section and an outer end section of a spiral spring (not shown) are stopped by the corresponding ones of the fixed flanges 7L, 7R and the movable flanges 8L, 8R. The spiral spring urges the seat back in a forward inclining direction relative to the seat cushion.

Figure 3:
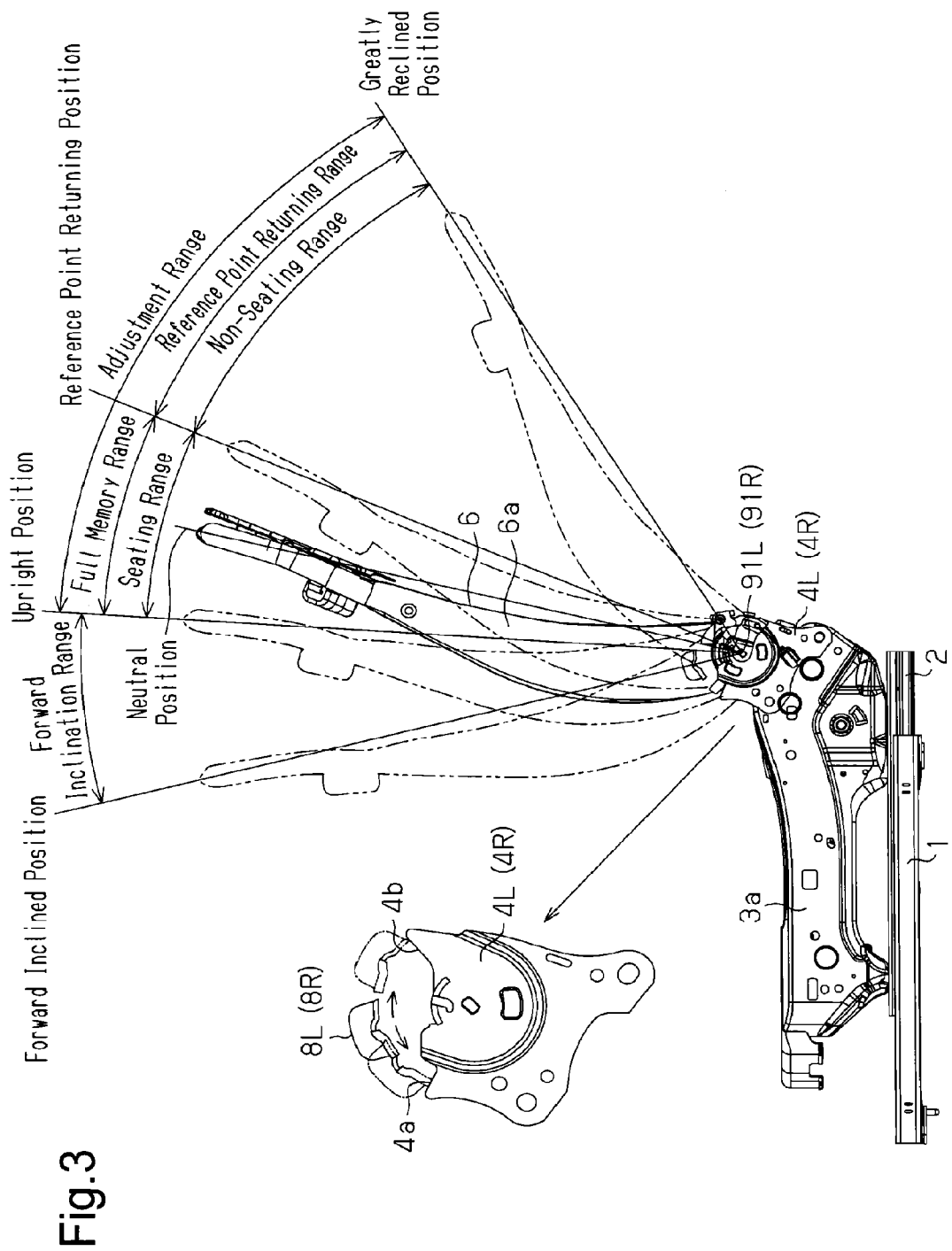
FIG. 3 is a side view showing the vehicle seat device and operation of the seat device.

As shown in FIG. 3, the seat back (the seat back frame 6) is inclinable about the axis of the hinge shafts 91L, 91R relative to the seat cushion (the seat cushion frame 3) in the range from a "forward inclined position," at which the seat back is inclined forward greatly to a "greatly reclined position," at which the seat back is reclined greatly.

That is, as shown in an enlarged state in FIG. 3, a front stopper 4a and a rear stopper 4b, which are shaped substantially as claws, project radially outward from upper sections of the lower plate 4L and the lower plate 4R, respectively, each in a manner blocking a rotation path of the corresponding movable flange 8L, 8R at opposite circumferential ends about the axis of the hinge shaft 91L, 91R. This limits the inclination range of the seat back (the seat back frame 6) relative to the seat cushion (the seat cushion frame 3) to a range at the end of which the movable flange 8L, 8R contacts the front stopper 4a or the rear stopper 4b. That is, the angular position of the seat back (the seat back frame 6) when the movable flange 8L, 8R contacts the front stopper 4a corresponds to the forward inclined position. The angular position of the seat back (the seat back frame 6) when the movable flange 8L, 8R contacts the rear stopper 4b corresponds to the greatly reclined position. The movable flanges 8L, 8R and the front stopper 4a configure a front stopper mechanism.

The inclination range of the seat back relative to the seat cushion is divided generally into a "forward inclination range" close to the forward inclined position and an "adjustment range" close to the greatly reclined position. When at an "upright position," which is the boundary angular position between the forward inclination range and the adjustment range, the seat back is in an upright state. The aforementioned lock mechanisms 5L, 5R adjust and maintain the angular position of the seat back relative to the seat cushion mainly in the adjustment range.

The adjustment range is divided further into a "seating range" close to the upright position and a "non-seating range" close to the greatly reclined position. The boundary angular position between the seating range and the non-seating range is referred to as a "reference point returning position." The seating range is set such that, if, for example, the seat back is inclined from a given angular position in the seating range to the forward inclined position within an inclination range of the seat back suitable for general seating postures, the seat back is returned to the original angular position immediately before forward inclination by raising the seat back afterward and thus canceling the forward inclination (a full memory range).

In contrast, the non-seating range is set such that, if, for example, the seat back is inclined from a given angular position in the non-seating range to the forward inclined position within an inclination range of the seat back suitable for atypical seating postures (such as a nap posture), the seat back is moved to the reference point returning position by raising the seat back afterward and thus canceling forward inclination (a reference point returning range).

The predetermined angular position of the seat back (the seat back frame 6) represented by the solid lines and curves in FIG. 3 is the angular position of the seat back that is most likely to be chosen by a typical seat occupant (hereinafter, referred to as a "neutral position").

The forward inclined position of the forward inclination range is the angular position of the seat back that facilitates access to a seat located rearward from the seat. When the seat back is inclined to the forward inclined position, the aforementioned slide lock device is unlocked such that the seat cushion is slid forward relative to the vehicle floor. In this manner, the vehicle seat device of the present embodiment exerts a walk-in function.

The lock mechanism 5L, which is located on one of the opposite sides, will hereafter be described.

As illustrated in FIG. 2, the lock mechanism 5L includes a first member 10L and a second member 20L, which are shaped like disks. The first member 10L is coaxial with the hinge shaft 91L (the coupling shaft 92) and welded and fixed to an inner side surface of the lower plate 4L (a seat cushion component). The second member 20L is also coaxial with the hinge shaft 91L (the coupling shaft 92) and welded and fixed to an outer side surface (a seat back component) of a lower end section of the back side frame 6a. The first member 10L and the second member 20L are retained in the axial direction by a ring-shaped holder 29L, which is configured by a metal plate.

Figure 4:
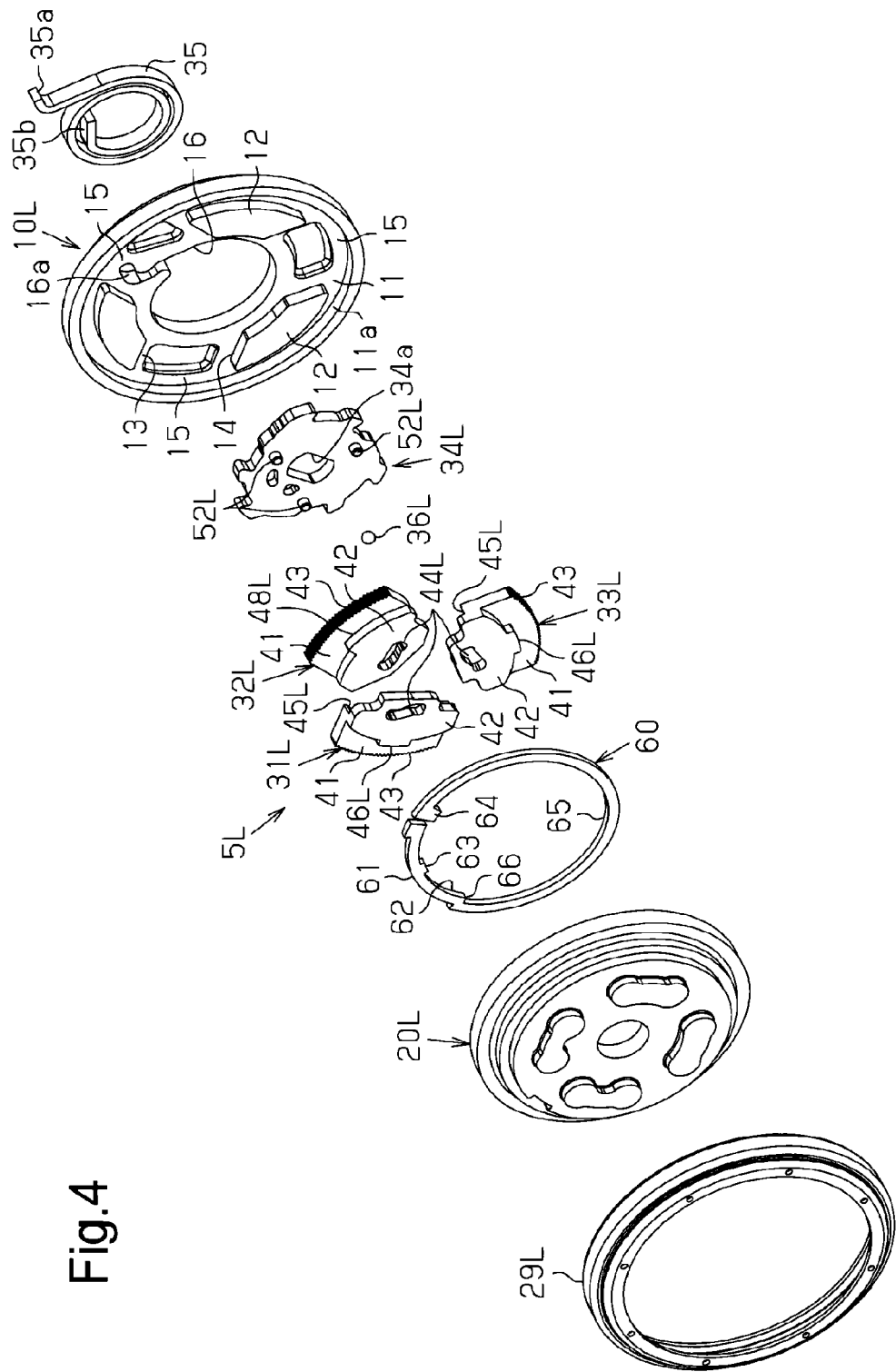
FIG. 4 is an exploded perspective view showing a lock mechanism.
Figure 5A:
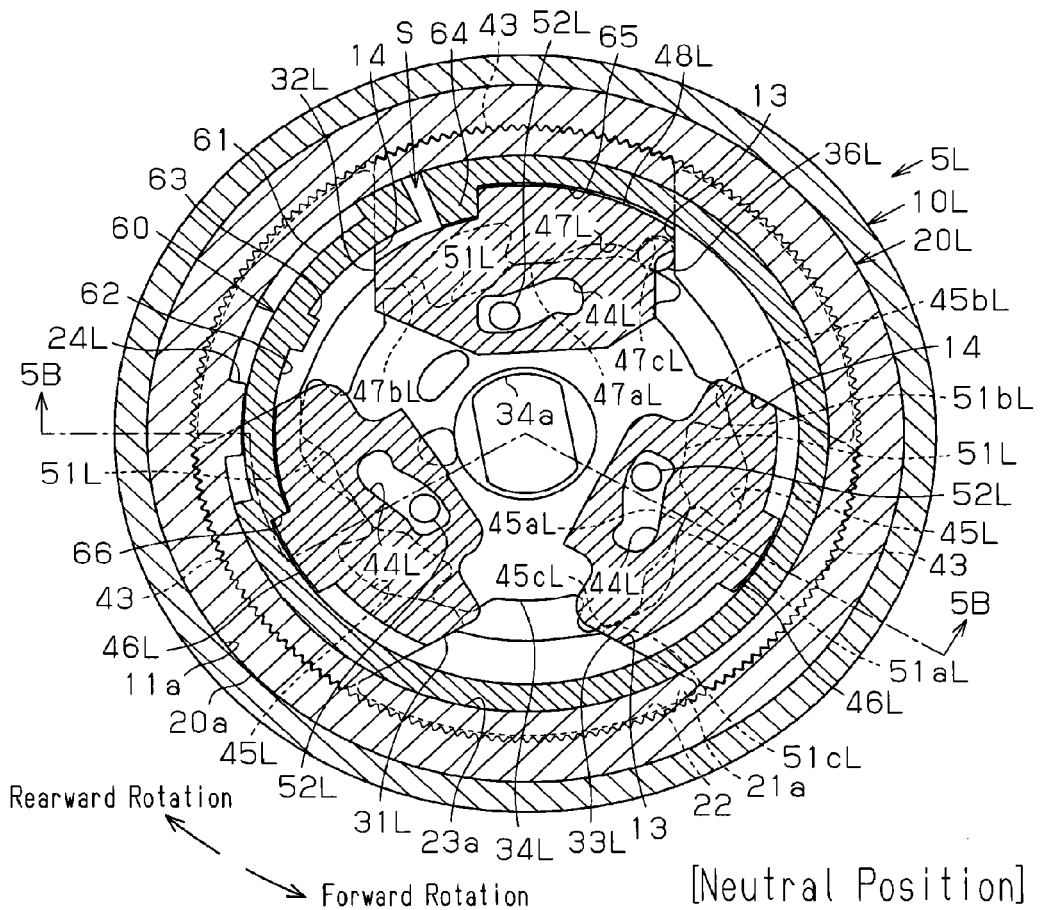
FIG. 5A is a cross-sectional view taken along line 5A-5A of FIG. 1, showing the lock mechanism in a locking state.
Figure 5B:
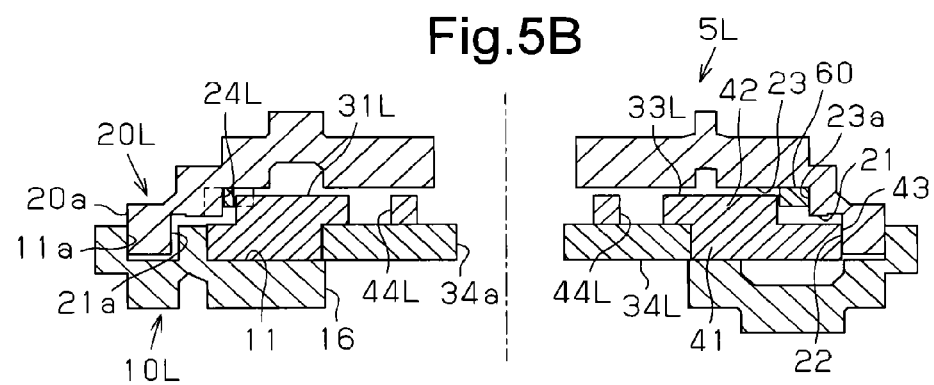
FIG. 5B is a cross-sectional view taken along line 5B-5B of FIG. 1.

As shown in FIGS. 4, 5A, and 5B, the first member 10L is molded through, for example, half blanking of a metal plate and has a circular recess 11, which has an opening facing the second member 20L. The recess 11 has an inner circumferential surface 11a, which extends about the axis of the hinge shaft 91L (the axis of the first member 10L and the second member 20L).

Three projecting portions 12, each of which has a substantially arcuate shape, are arranged in the recess 11 of the first member 10L and spaced apart at equal circumferential angular intervals. Each of the projecting portions 12 has guide walls 13, 14, which are located at opposite sides in the circumferential direction of the projecting portion 12. The circumferentially opposing guide walls 13, 14 of each adjacent pair of the projecting portions 12 extend parallel to each other in the radial direction about the axis. The guide walls 13, 14 cooperate with the bottom surface of the recess 11, thus configuring substantially U-groove-shaped guide grooves 15, each of which extends in the radial direction about the axis, in a state spaced apart at equal circumferential angular intervals. The guide grooves 15 communicate with one another in a central section and configure a substantial Y shape as a whole.

A substantially circular through hole 16 is located in the central section in which the three guide grooves 15 of the first member 10L communicate with one another. The through hole 16 has a stopping hole 16a, which is provided at a predetermined angular position at an outer radial side.

As shown in FIGS. 5A and 5B, the second member 20L is molded through, for example, half blanking of a metal plate. The second member 20L has an outer circumferential surface 20a having an outer diameter equal to the inner diameter of the inner circumferential surface 11a of the first member 10L and a circular recess 21 having an opening facing the first member 10L. Inner teeth 22 is located in an inner circumferential surface 21a of the recess 21, which extends about the axis of the hinge shaft 91L (the axis of the first member 10L and the second member 20L), and extends along the full circumference of the inner circumferential surface 21a. A substantially circular accommodating recess 23 is located on an inner radial side of the recess 21 coaxially with the recess 21. A substantially arcuate engaging projection 24L, which is arranged at a predetermined angular position and projects toward the center, is located in an inner circumferential surface 23a of the accommodating recess 23. The outer circumferential surface 20a of the second member 20L is fit along the inner circumferential surface 11a of the first member 10L in a slidable contact manner.

As illustrated in FIG. 4, the holder 29L is installed on an outer circumference of the first member 10L and an outer circumference of the second member 20L with the inner circumferential surface 11a of the first member 10L fit to the outer circumferential surface 20a of the second member 20L. The first member 10L and the second member 20L are retained in the axial direction while being permitted to rotate relative to each other through the holder 29L.

Three first pawls 31L, 32L, 33L, a cam 34L, a spiral spring 35 serving as an urging member, a pressing member 36L, and a memory ring 60 are arranged between the first member 10L and the second member 20L.

The first pawls 31L to 33L are each installed between the corresponding adjacent pair of the guide walls 13, 14 and spaced apart at equal angular intervals in a circumferential direction about the axis. The first pawls 31L to 33L are manufactured by forging steel, for example, and each include a first block 41 and a second block 42, which are provided in a stepped manner in the axial direction. In each of the first pawls 31L to 33L, as viewed in the radial direction, the first block 41 is located on the side corresponding to the inner circumferential surface 21a of the second member 20L and the second block 42 is arranged on the side corresponding to the axis of the second member 20L. Opposite widthwise end sections of each first block 41 coincide with opposite widthwise end sections of the corresponding second block 42. The widthwise end sections of the corresponding first and second blocks 41, 42 are configured linearly to be parallel with each other.

Outer teeth 43, which can be meshed with the inner teeth 22 of the second member 20L, is located in an arcuate outer end (the end surface facing the inner teeth 22 of the second member 20L) of each first block 41. A first pawl groove cam portion 44L, which extends through each second block 42 in the thickness direction, is located in the second block 42 substantially at the center position in the width direction.

As shown in FIG. 5A, each first pawl 31L to 33L is guided to move in the radial direction about the axis with opposite widthwise end sections of the first pawl 31L to 33L held in slidable contact with the two guide walls 13, 14. Each first pawl 31L to 33L selectively proceeds and retreats along the guide walls 13, 14 in the radial direction to mesh or separate the outer teeth 43 and the inner teeth 22 with respect to each other.

In two of the first pawls, which are the first pawls 31L and 33L, an inner surface cam portion 45L, which is engaged with an outer circumference of the cam 34L, is located at an inner end (the back surface that is the end surface opposite to the outer end) of the first block 41. The inner surface cam portion 45L, which is provided in the stepped portion of the first pawl 31L, 33L, includes three pawl cam surfaces 45aL, 45bL, 45cL at the center and the opposite ends in the circumferential direction of the first pawl 31L, 33L. The pawl cam surfaces 45aL, 45bL, 45cL face an outer circumference (a cam surface 51L) of the cam 34L. Each of the pawl cam surfaces 45aL, 45bL, 45cL is configured by a cam surface having an inclined surface that approaches the outer circumference of the cam 34L when locking operation is performed as the cam 34L is rotated in the counterclockwise direction as viewed in the drawing (hereinafter, referred to as the "locking rotation direction").

In each of the first pawls 31L, 33L, an arcuate first pawl engaging projection 46L projects radially outward from the second block 42 to face the accommodating recess 23 (the inner circumferential surface 23a) in the radial direction. The first pawl engaging projection 46L is arranged in the middle circumferential section of the first pawl 31L, 33L.

In the remaining one of the first pawls, which is the first pawl 32L, an inner surface cam portion 47L, which is engaged with the outer circumference of the cam 34L, is located at the inner end (the back surface that is the end surface opposite to the outer end) of the first block 41. The inner surface cam portion 47L, which is provided in the stepped portion of the first pawl 32L, includes pawl cam surfaces 47aL and 47bL similar to the pawl cam surfaces 45aL and 45bL, respectively, and a pawl cam surface 47cL instead of the pawl cam surface 45cL. The pawl cam surface 47cL faces the outer circumference (the cam surface 51L) of the cam 34L and is shaped to define a wedge-shaped space between the pawl cam surface 47cL and the circumferentially facing one of the guide walls 13. That is, the space between the guide wall 13 and the pawl cam surface 47cL is shaped to become smaller radially outward.

In the first pawl 32L, an arcuate first pawl engaging projection 48L projects radially outward from the second block 42 to face the accommodating recess 23 (the inner circumferential surface 23a) in the radial direction. The first pawl engaging projection 48L is arranged at a position forward in the clockwise direction as viewed in FIG. 5A in the circumferential direction of the first pawl 32L.

The cam 34L is arranged at a position radially inward from the first pawls 31L to 33L in the recess 21 of the second member 20L to be rotational about the axis of the second member 20L. That is, the cam 34L is manufactured by pressing a flat steel plate, for example, and has a flat shape that basically lacks a step. A substantially oval cam fitting hole 34a, which extends along the axis in the thickness direction, is located in a central portion of the cam 34L. A distal end section of the hinge shaft 91L is inserted through the cam fitting hole 34a. The cam 34L is thus allowed to rotate integrally with the components of the hinge shaft 91L at a position radially inward from the first pawls 31L to 33L (the first blocks 41).

The cam 34L has three sets of cam surfaces 51L, which are spaced apart at equal circumferential angular intervals in an outer circumference of the cam 34L. Each of the cam surfaces 51L includes three pressing cam portions 51aL, 51bL, 51cL at the center and the opposite ends in the circumferential direction of the cam surface 51L. Two of the pressing cam portions, which are the cam portions 51aL and 51bL, are adapted to contact the two facing pawl cam surfaces 45aL, 45bL of each first pawl 31L, 33L or the two facing pawl cam surfaces 47aL, 47bL of the first pawl 32L. The two pressing cam portions 51aL, 51bL press the corresponding ones of the pawl cam surfaces 45aL, 45bL, 47aL, 47bL when the cam 34L is rotated in the locking rotation direction.

The remaining one of the pressing cam portions, which is the pressing cam portion 51cL, is adapted to contact the facing pawl cam surface 45cL of each first pawl 31L, 33L and presses the pawl cam surface 45cL when the cam 34L is rotated in the locking rotation direction. Alternatively, the pressing cam portion 51cL causes a spherical pressing member 36L to be accommodated in the aforementioned wedge-shaped space, which is located between the pawl cam surface 47cL of the first pawl 32L and the corresponding guide wall 13. The pressing member 36L is movable in the radial direction while being held in slidable contact with the pawl cam surface 47cL and the guide wall 13. The pressing cam portion 51cL is adapted to contact the pressing member 36L from outside and presses the pressing member 36L when the cam 34L is rotated in the locking rotation direction.

That is, when the cam 34L is rotated in the locking rotation direction, the pressing cam portions 51aL to 51cL are maintained at such angular positions that the pressing cam portions 51aL to 51cL contact (in a pressing manner) the pawl cam surfaces 45aL to 45cL of the first pawls 31L, 33L, the pawl cam surfaces 47aL, 47bL of the first pawl 32L, and the pressing member 36L.

The pressing member 36L contacts the corresponding guide wall 13 and the pawl cam surface 47cL by being pressed by the cam 34L. At this time, the pressing force of the pressing member 36L is divided into component force of the element (the radial element) in the moving direction of the first pawl 32L and component force of the element (the circumferential element) in the width direction of the pawl, which is perpendicular to the moving direction. A wedge effect caused by pressing with the component force of the element in the width direction of the first pawl 32L generates circumferential force by which a widthwise end section of the first pawl 32L and the guide wall 13 separate from each other, thus blocking the gap between the widthwise end section of the first pawl 32L and the guide wall 14. This restrains rattling of the seat back with respect to the seat cushion.

In contrast, when unlocking operation is performed as the cam 34L is rotated in the clock direction as viewed in the drawing (hereinafter, referred to also as the "unlocking rotation direction"), the pressing cam portions 51aL, 51bL are separated from the pawl cam surfaces 45aL, 45bL of the corresponding first pawl 31L, 33L or the pawl cam surfaces 47aL, 47bL of the first pawl 32L. Also, the pressing cam portion 51cL is separated from the pawl cam surface 45cL of the corresponding first pawl 31L, 33L or from the pressing member 36L.

As illustrated in FIG. 4, a plurality of (three) engaging protrusions 52L projects from a side surface of the cam 34L, and the engaging protrusions 52L are spaced apart at circumferential intervals. The engaging protrusions 52L are inserted in and engaged with the first pawl groove cam portions 44L of the corresponding first pawls 31L to 33L. The first pawl groove cam portions 44L and the engaging protrusions 52L operate to move the first pawls 31L to 33L radially inward when the cam 34L is rotated in the unlocking rotation direction.

That is, as shown in FIG. 5A, each of the first pawl groove cam portions 44L is shaped to gradually move radially outward, in a basic manner, as the cam 34L proceeds in the unlocking rotation direction (the clockwise direction as viewed in the drawing). As a result, when the cam 34L is rotated in the unlocking rotation direction, the first pawls 31L to 33L, the first pawl groove cam portions 44L of which are pressed by the engaging protrusions 52L, are retracted radially inward.

As shown in FIG. 4, the spiral spring 35 urges the cam 34L in the locking rotation direction such that the first pawls 31L to 33L moves radially to become engaged with the second member 20L. The spiral spring 35 is accommodated in the through hole 16 of the first member 10L. The spiral spring 35 is provided by curving a flat wire section, which has a substantially rectangular shape, in a predetermined spiral shape. The spiral spring 35 is arranged between the first member 10L and the cam 34L. That is, an outer end section 35a of the spiral spring 35 is stopped by the stopping hole 16a. An inner end section 35b of the spiral spring 35 is stopped by a stopper portion (not shown) projecting from an end surface of the cam 34L.

The urging force of the spiral spring 35 urges the cam 34L in the locking rotation direction (the counterclockwise direction as viewed in FIG. 5A) relative to the first member 10L. The cam surfaces 51L of the cam 34L thus press the corresponding first pawls 31L to 33L radially outward, thus meshing the respective outer teeth 43 with the inner teeth 22 of the second member 20L.

As shown in FIGS. 5A and 5B, the memory ring 60 has an annular shape having a discontinuous section. The memory ring 60 can contract by elastically deforming radially inward and can extend by elastically recovering its original shape radially outward. The discontinuous section S of the memory ring 60 is arranged between the first pawl engaging projection 46L of the first pawl 31L and the first pawl engaging projection 48L of the first pawl 32L, which are adjacent to each other. While being held in this state and in a contracted state, the memory ring 60 is accommodated in the accommodating recess 23 of the second member 20L in a circumferentially slidable manner, or, in other words, a rotational manner.

The section of the memory ring 60 close to the first pawl 31L with respect to the discontinuous section S is relatively contracted. The outer circumferential surface and the inner circumferential surface of this section, which have arcuate shapes, configure a rotation permitting portion 61 and a first unlocking engaging surface 62, respectively. The memory ring 60 also has an arcuate reference point returning projection 63, which projects radially inward from the center in the circumferential direction of the first unlocking engaging surface 62.

The end section of the memory ring 60 close to the first pawl 32L (the pawl engaging projection 48L) with respect to the discontinuous section S is projected radially inward to configure an engagement portion 64. The engagement portion 64 is constantly overlapped with the first pawl engaging projection 48L at a radial position, regardless of the position of the first pawl 32L, which moves radially in the corresponding guide groove 15. As a result, when the engagement portion 64 is located adjacent to the first pawl engaging projection 48L, rotation of the memory ring 60 in the clockwise direction as viewed in FIG. 5 relative to the first pawl 32L, which is rotation of the memory ring 60 in the clockwise direction relative to the first member 10L, is constantly restricted.

The arcuate inner circumferential surface of the memory ring 60 between the first unlocking engaging surface 62 and the engagement portion 64 configures a first locking engaging surface 65, which has an inner diameter greater than the inner diameter of the first unlocking engaging surface 62. The boundary position (the step) between the first unlocking engaging surface 62 and the first locking engaging surface 65 is constantly overlapped with the first pawl engaging projection 46L, which is arranged at the first locking engaging surface 65, at a radial position when, for example, the first pawl 31L moves radially outward in the corresponding guide groove 15, or, in other words, the outer teeth 43 of the first pawl 31L is meshed with the inner teeth 22. As a result, at this time, rotation of the memory ring 60 in the counterclockwise direction as viewed in FIG. 5A relative to the first pawl 31L, which is rotation of the memory ring 60 in the counterclockwise direction relative to the first member 10L, is constantly restricted. The boundary position with a stepped shape between the first unlocking engaging surface 62 and the first locking engaging surface 65 configures a restricting surface 66.

As illustrated in FIG. 6, the restricting surface 66 is constantly and partially overlapped with the first pawl engaging projection 46L, which is located at the first locking engaging surface 65, at a radial position when the first pawl 31L moves radially inward in the corresponding guide groove 15 as the cam 34L is operated in accordance with unlocking operation, which is when the outer teeth 43 of the first pawl 31L is separated from the inner teeth 22. As a result, also at this time, through partial engagement in the radial direction between the memory ring 60 and the first pawl engaging projection 46L at the restricting surface 66, rotation of the memory ring 60 in the counterclockwise direction as viewed in FIG. 6 relative to the first pawl 31L, which is rotation of the memory ring 60 in the counterclockwise direction relative to the first member 10L, is constantly restricted. The unlocking operation of the cam 34L at this time is referred to also as a first unlocking operation.

That is, when the outer teeth 43 of the first pawls 31L to 33L are meshed with the inner teeth 22 or the outer teeth 43 of the first pawls 31L to 33L are separated from the inner teeth 22 as the cam 34L is operated in accordance with the first unlocking operation, rotation of the memory ring 60 relative to the first member 10L is constantly restricted.

The engaging projection 24L, which is located in the second member 20L, is arranged in the rotation permitting portion 61 in the circumferential direction. As a result, when rotation of the memory ring 60 relative to the first member 10L is restricted, the engaging projection 24L (the second member 20L) is permitted to rotate in the range corresponding to the rotation permitting portion 61. FIGS. 5A and 6 represent the state in which the seat back is arranged at a neutral position.

As illustrated in FIG. 7, when the second member 20L rotates in the counterclockwise direction as viewed in the drawing relative to the memory ring 60 (and the first member 10L) with the outer teeth 43 separated from the inner teeth 22, rotation of the second member 20L is restricted by the engaging projection 24L when the engaging projection 24L reaches the corresponding finishing end of the rotation permitting portion 61. Rotation of the second member 20L relative to the first member 10L at this time inclines the seat back forward relative to the seat cushion and is referred to also as forward rotation hereinafter. Therefore, the state in which the engaging projection 24L is located at the corresponding finishing end of the rotation permitting portion 61 at the time of the forward rotation of the second member 20L corresponds to an upright position of the seat back.

As shown in FIG. 8, when the second member 20L rotates in the clockwise direction as viewed in the drawing relative to the memory ring 60 (and the first member 10L) with the outer teeth 43 separated from the inner teeth 22, rotation of the second member 20L is restricted by the engaging projection 24L when the engaging projection 24L reaches the corresponding finishing end of the rotation permitting portion 61. Rotation of the second member 20L relative to the first member 10L at this time inclines the seat back rearward relative to the seat cushion and is referred to also as rearward rotation hereinafter. Therefore, the state in which the engaging projection 24L reaches the corresponding finishing end of the rotation permitting portion 61 at the time of the rearward rotation of the second member 20L corresponds to a greatly reclined position of the seat back.

As shown in FIG. 9, the restricting surface 66 does not become overlapped with the first pawl engaging projection 46L at a radial position when the first pawl 31L continuously moves radially inward in the corresponding guide groove 15 as the cam 34L is operated in accordance with unlocking operation. As a result, at this time, rotation of the memory ring 60 in the counterclockwise direction as viewed in the drawing relative to the first pawl 31L, which is rotation of the memory ring 60 in the counterclockwise direction relative to the first member 10L, is permitted through radial disengagement of the memory ring 60 from the first pawl engaging projection 46L at the restricting surface 66. Simultaneously, the memory ring 60 can rotate integrally with the second member 20L through friction engagement between the memory ring 60 and the second member 20L caused by elastic deformation of the memory ring 60.

As a result, when, in this state, the second member 20L starts to rotate forward relative to the first member 10L, the memory ring 60 starts to rotate integrally with the second member 20L while maintaining its position relative to the second member 20L. This causes the first pawl engaging projection 46L, which has been located at the restricting surface 66, to be moved from the first locking engaging surface 65 onto the first unlocking engaging surface 62. At this time, radial outward movement of the first pawl 31L, which is in a state separated from the inner teeth 22, is restricted by the first unlocking engaging surface 62, onto which the first pawl engaging projection 46L has been moved. In this manner, the first pawl 31L is maintained in the state separated from the inner teeth 22. The other first pawls 32L, 33L, which cooperate with the first pawl 31L through the cam 34L, operate in the same manners as the first pawl 31L. The unlocking operation of the cam 34L at this time is referred to as a second unlocking operation.

Figure 10:
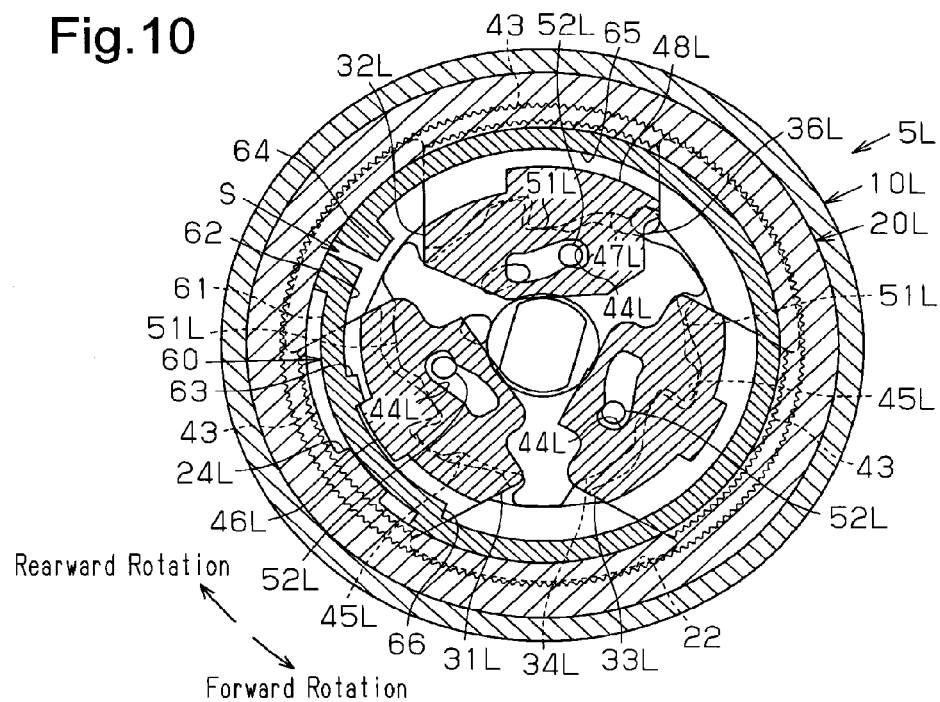
FIG. 10 is a cross-sectional view showing the state of the lock mechanism when the lock mechanism is inclined forward from the neutral position.

As shown in FIG. 10, when the seat back is arranged at the neutral position and the second member 20L is rotated forward together with the memory ring 60, the rotation amount to the rotating position corresponding to the forward inclined position of the seat back is relatively small. As a result, when the first pawl engaging projection 46L, which is on the first unlocking engaging surface 62, reaches the reference point returning projection 63, the seat back is inclined forward past the forward inclined position. In other words, in the state in which the seat back is at the forward inclined position, the first pawl engaging projection 46L is located closer to the restricting surface 66 than the reference point returning projection 63 of the first unlocking engaging surface 62.

Therefore, when the seat back is raised and its forward inclination is canceled, the second member 20L is rotated rearward together with the memory ring 60. Then, once the first locking engaging surface 65 reaches the first pawl engaging projection 46L, the first pawl 31L can be meshed with the inner teeth 22. The other ones of the pawls cooperating with the first pawl 31L through the cam 34L, which are the first pawls 32L, 33L, operate in the same manners as the first pawl 31L. Meshing of the first pawls 31L to 33L and the inner teeth 22 restricts further rearward rotation of the second member 20L together with the memory ring 60. The rotating position of the second member 20L relative to the first member 10L at this time coincides with the rotating position at which the second member 20L starts to rotate together with the memory ring 60 as the cam 34L is operated in accordance with unlocking operation. That is, the angular position at which rearward inclination of the seat back is restricted coincides with the original angular position (hereinafter, referred to as the "memory position") at which the seat back starts to incline forward as the cam 34L is operated in accordance with a second unlocking operation.

Figure 11:
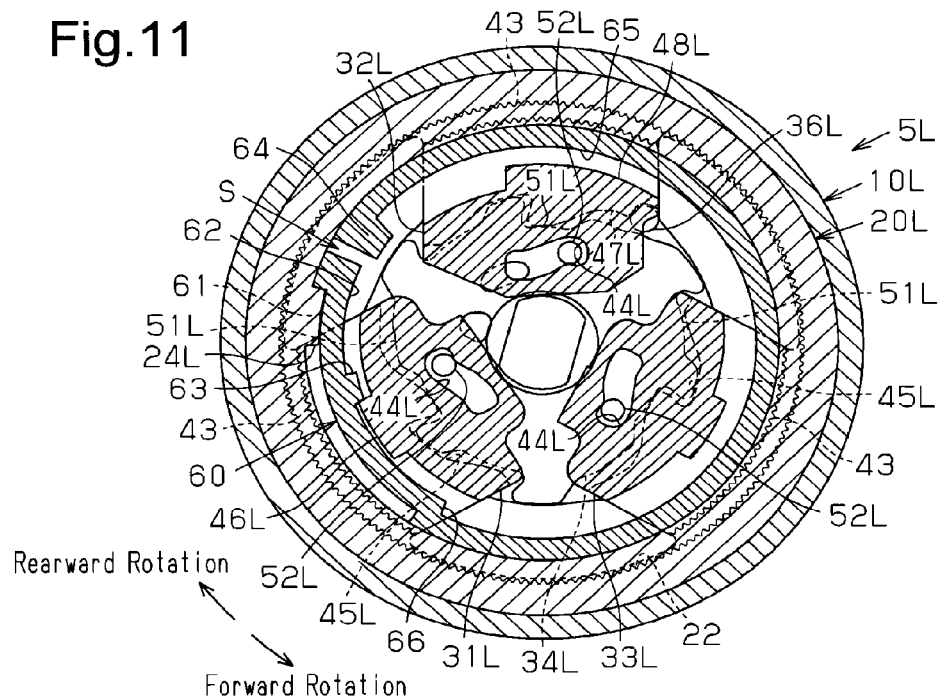
FIG. 11 is a cross-sectional view showing the state of the lock mechanism when the lock mechanism is inclined forward from the greatly reclined position.

In contrast, as shown in FIG. 11, when the seat back is arranged at the greatly reclined position and the second member 20L is rotated forward together with the memory ring 60, the rotation amount to the rotating position corresponding to the forward inclined position of the seat back is relatively great. This makes it impossible for the seat back to reach the forward inclined position when the first pawl engaging projection 46L, which is on the first unlocking engaging surface 62, reaches the reference point returning projection 63. At this time, the memory ring 60 becomes engaged in the radial direction with the first pawl engaging projection 46L through the reference point returning projection 63. This re-restricts rotation of the memory ring 60 in the counterclockwise direction as viewed in FIG. 11 relative to the first pawl 31L, which is rotation of the memory ring 60 in the counterclockwise direction relative to the first member 10L. That is, rotation of the memory ring 60 relative to the first member 10L is constantly restricted and rotation of the memory ring 60 relative to the second member 20L is permitted. In other words, even when the seat back reaches the forward inclined position, the memory ring 60 continuously maintains the contact state between the reference point returning projection 63 and the first pawl engaging projection 46L.

Therefore, when the seat back is raised and its forward inclination is canceled, the second member 20L is rotated rearward together with the memory ring 60. Then, once the first locking engaging surface 65 reaches the first pawl engaging projection 46L, the first pawl 31L can be meshed with the inner teeth 22. The other ones of the pawls cooperating with the first pawl 31L through the cam 34L, which are the first pawls 32L, 33L, operate in the same manners as the first pawl 31L. Meshing of the first pawls 31L to 33L and the inner teeth 22 restricts further rearward rotation of the second member 20L together with the memory ring 60.

The rotation amount of the second member 20L relative to the first member 10L at this time coincides with a predetermined angle corresponding to the angle between the restricting surface 66 and the reference point returning projection 63. That is, the angular position at which rearward inclination of the seat back is restricted coincides with the angular position at which the seat back is reclined from the forward inclined position by the predetermined angle. The reference point returning position of the seat back corresponds to the angular position to which the seat back is returned at this time. In other words, if the rotation amount of the second member 20L relative to the first member 10L at the time the seat back is inclined forward to the forward inclined position exceeds the predetermined angle, that is, if the angular position at which the seat back starts to incline forward falls in the range from the reference point returning position to the greatly reclined position and is included in the non-seating range, the seat back is set to the reference point returning position when the seat back is raised and its forward inclination is canceled. In this manner, when the forward inclination is started from the non-seating range, which is for atypical seating postures, the seat back is moved into the seating range to facilitate manipulation.

The lock mechanism 5R, which is at the opposite side, will hereafter be described.

As illustrated in FIG. 2, the lock mechanism 5R includes a first member 10R and a second member 20R, which are shaped like disks. The first member 10R is coaxial with the hinge shaft 91R (the coupling shaft 92) and welded and fixed to an inner side surface of the lower plate 4R (a seat cushion component). The second member 20R is also coaxial with the hinge shaft 91R (the coupling shaft 92) and welded and fixed to an outer side surface (a seat back component) of a lower end section of the back side frame 6a. The first member 10R and the second member 20R are retained by a ring-shaped holder 29R, which is configured by a metal plate, in the axial direction.

Figure 12:
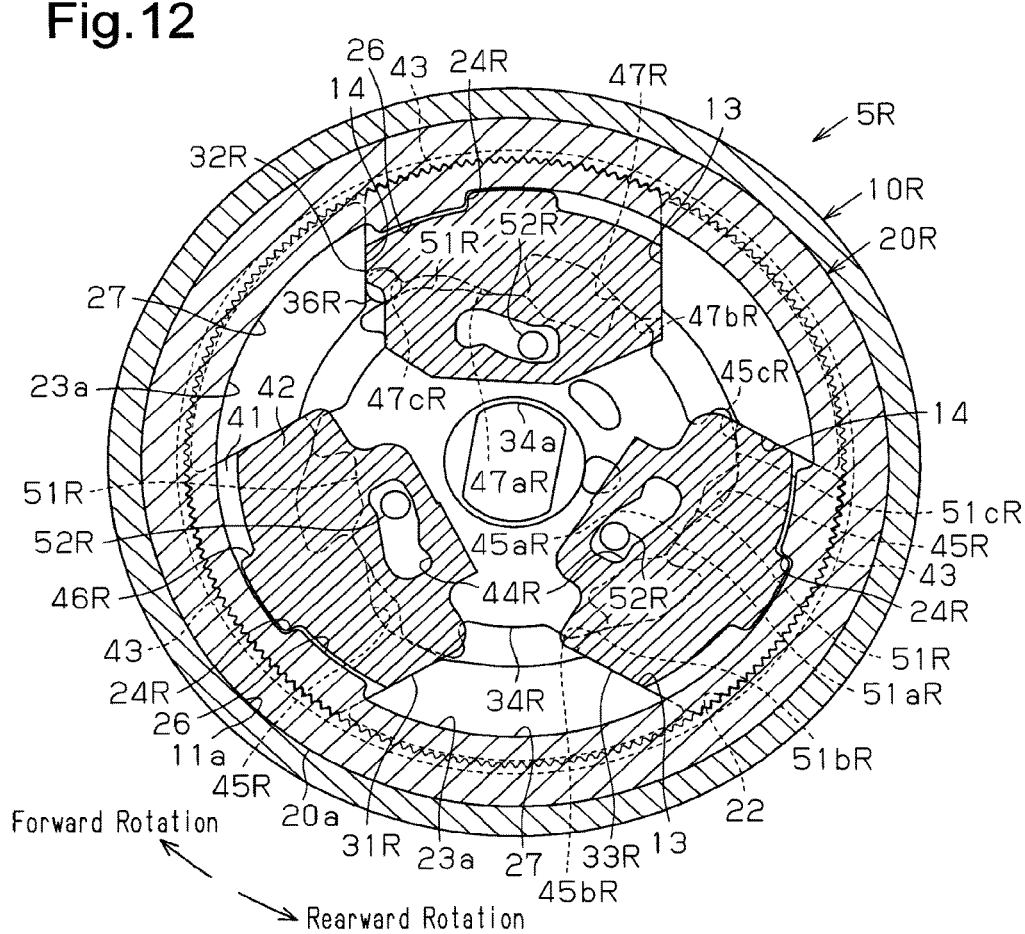
FIG. 12 is a cross-sectional view taken along line 12-12 of FIG. 1, showing the lock mechanism in a locking state.

As shown in FIG. 12, the first member 10R is shaped through, for example, half-blanking of a metal plate and configured substantially identical to the first member 10L, except that the first members 10R and 10L are configured laterally symmetrical.

The second member 20R is shaped through, for example, half-blanking of a metal plate and configured substantially identical to the second member 20L, except that the second members 20R and 20L are configured laterally symmetrical. A plurality of (three) substantially arcuate engaging projections 24R, which are spaced apart at equal angular intervals, project toward the center from the inner circumferential surface 23a of the accommodating recess 23. The second member 20R has second unlocking engaging surfaces 26, each of which is located on the inner circumferential surface of the corresponding one of the engaging projections 24R, and second locking engaging surfaces 27, each of which is located between the corresponding adjacent pair of the engaging projections 24R on the inner circumferential surface 23a.

Three second pawls 31R, 32R, and 33R, a cam 34R, a pressing member 36R, and the spiral spring 35 are arranged between the first member 10R and the second member 20R.

Each of the second pawls 31R to 33R is manufactured by forging steel, for example, and configured substantially identical to the first pawls 31L to 33L, except that the first pawls 31L to 33L and the corresponding second pawls 31R to 33R are configured laterally symmetrical. A second pawl groove cam portion 44R, which extends through the second block 42 in the thickness direction, is located substantially in the middle section of the second block 42 in the width direction.

In each of the second pawls 31R to 33R, an arcuate second pawl engaging projection 46R projects radially outward from the second block 42 to radially face the accommodating recess 23 (the inner circumferential surface 23a). The second pawl engaging projection 46R is arranged at the center in the circumferential direction of the second pawl 31R to 33R.

In two of the second pawls, which are the second pawls 31R and 33R, an inner surface cam portion 45R, which is engaged with an outer circumference of the cam 34R, is located at an inner end (the back surface that is the end surface opposite to an outer end) of the first block 41. The inner surface cam portion 45R, which is provided in the stepped portion of the second pawl 31R, 33R, includes three pawl cam surfaces 45aR, 45bR, 45cR at the center and the opposite ends in the circumferential direction of the second pawl 31R, 33R. The pawl cam surfaces 45aR, 45bR, 45cR face an outer circumference (a cam surface 51R) of the cam 34R. Each of the pawl cam surfaces 45aR, 45bR, 45cR is configured by a cam surface having an inclined surface that approaches the outer circumference of the cam 34R when locking operation is performed as the cam 34R rotates in the counterclockwise direction as viewed in FIG. 12 (hereinafter, referred to as the "locking rotation direction").

In the remaining one of the second pawls, which is the second pawl 32R, an inner surface cam portion 47R, which is engaged with the outer circumference of the cam 34R, is located at the inner end (the back surface that is the end surface opposite to the outer end) of the first block 41. The inner surface cam portion 47R, which is located in the stepped portion of the second pawl 32R, includes pawl cam surfaces 47aR and 47bR similar to the pawl cam surfaces 45aR and 45bR, respectively, and a pawl cam surface 47cR instead of the pawl cam surface 45cR. The pawl cam surface 47cR faces the outer circumference (the cam surface 51R) of the cam 34R and shaped to define a wedge-shaped space with respect to the circumferentially facing guide wall 13. That is, the space between the guide wall 13 and the pawl cam surface 47cR is shaped to become smaller radially outward.

The cam 34R is manufactured by pressing a flat steel plate, for example, and configured substantially identical to the cam 34L, except that that the cams 34L and 34R are laterally symmetrical. By inserting a distal end section of a hinge shaft 91R through the cam fitting hole 34a, the cam 34R is allowed to rotate integrally with the hinge shaft 91R at a position radially inward from the second pawls 31R to 33R. That is, the left and right cams 34L and 34R (the lock mechanisms 5L and 5R) are coupled to each other to operate synchronously with each other through the hinge shafts 91L, 91R and the coupling shaft 92.

The cam 34R has three sets of cam surfaces 51R, which are spaced apart at equal circumferential angular intervals in an outer circumference of the cam 34R. Each of the cam surfaces 51R includes three pressing cam portions 51aR, 51bR, 51cR at the center and the opposite ends in the circumferential direction of the cam surface 51R. Two of the pressing cam portions, which are the cam portions 51aR and 51bR, are adapted to contact the two facing pawl cam surfaces 45aR, 45bR of each second pawl 31R, 33R or the two facing pawl cam surfaces 47aR, 47bL of the second pawl 32R. The two pressing cam portions 51aR, 51bR press the corresponding ones of the pawl cam surfaces 45aR, 45bR, 47aR, 47bR when the cam 34R is rotated in the locking rotation direction.

The remaining one of the pressing cam portions, which is the pressing cam portion 51cR, is adapted to contact the facing pawl cam surface 45cR of each second pawl 31R, 33R and presses the pawl cam surface 45cR when the cam 34R is rotated in the locking rotation direction. Alternatively, the pressing cam portion 51cR causes a spherical pressing member 36R to be accommodated in the aforementioned wedge-shaped space, which is located between the pawl cam surface 47cR of the second pawl 32R and the corresponding guide wall 13. The pressing member 36R is movable in the radial direction while being held in slidable contact with the pawl cam surface 47cR and the guide wall 13. The pressing cam portion 51cR is adapted to contact the pressing member 36R from outside and presses the pressing member 36R when the cam 34R is rotated in the locking rotation direction.

That is, when the cam 34R is rotated in the locking rotation direction, the pressing cam portions 51aR to 51cR are maintained at such angular positions that the pressing cam portions 51aR to 51cR contact (in a pressing manner) the pawl cam surfaces 45aR to 45cR of the second pawls 31R, 33R, the pawl cam surfaces 47aR, 47bR of the second pawl 32R, and the pressing member 36R.

The pressing member 36R contacts the corresponding guide wall 13 and the pawl cam surface 47cR by being pressed by the cam 34R. At this time, the pressing force of the pressing member 36R is divided into component force of the element (the radial element) in the moving direction of the second pawl 32R and component force of the element (the circumferential element) in the width direction of the pawl, which is perpendicular to the moving direction. A wedge effect caused by pressing with the component force of the element in the width direction of the second pawl 32R generates circumferential force by which a widthwise end section of the second pawl 32R and the guide wall 13 separate from each other, thus blocking the gap between the widthwise end section of the second pawl 32R and the guide wall 14. This restrains rattling of the seat back with respect to the seat cushion.

Figure 13:
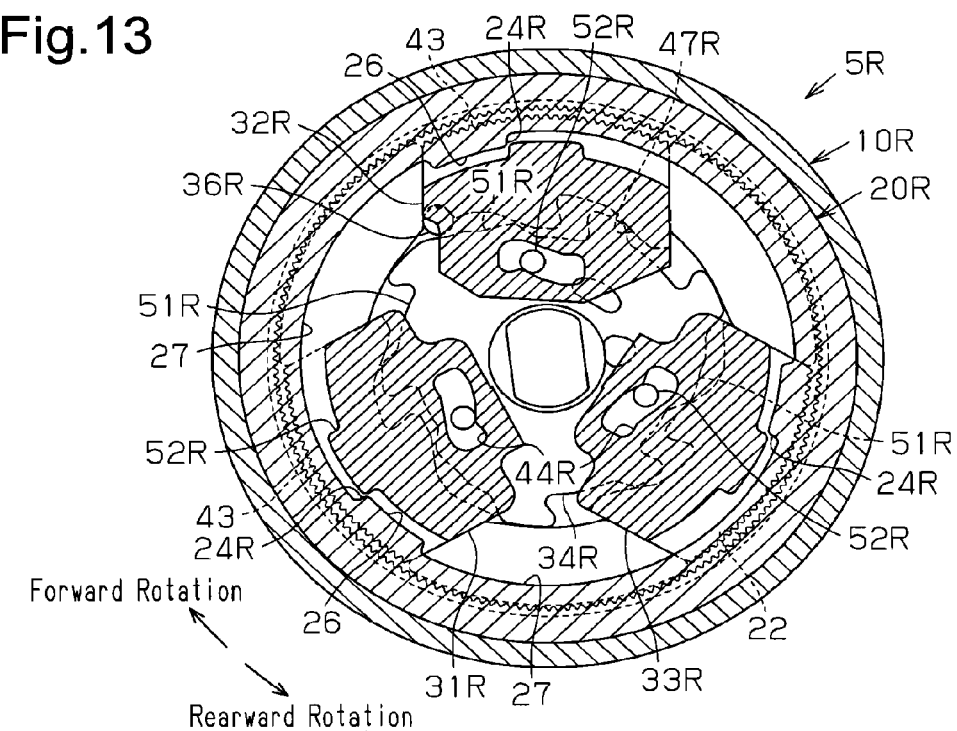
FIG. 13 is a cross-sectional view showing a state of a first unlocking operation of the lock mechanism.

In contrast, as illustrated in FIG. 13, when unlocking operation is performed as the cam 34R is rotated in the clockwise direction as viewed in the drawing (hereinafter, referred to also as the "unlocking rotation direction"), the pressing cam portions 51aR, 51bR are separated from the pawl cam surfaces 45aR, 45bR of the corresponding second pawl 31R, 33R or the pawl cam surfaces 47aR, 47bR of the second pawl 32R. Also, the pressing cam portion 51cR is separated from the pawl cam surface 45cR of the corresponding second pawl 31R, 33R or from the pressing member 36R.

As illustrated in FIG. 12, multiple (three) engaging protrusions 52R are projected from a side surface of the cam 34R and spaced apart at circumferential intervals. The engaging protrusions 52R are inserted in and engaged with the second pawl groove cam portions 44R of the corresponding second pawls 31R to 33R. The second pawl groove cam portions 44R and the engaging protrusions 52R operate to move the second pawls 31R to 33R radially inward when the cam 34R is rotated in the unlocking rotation direction.

Basically, as shown in FIG. 13, basically, each of the second pawl groove cam portions 44R gradually shifts radially outward toward the end in the unlocking direction of the cam 34R proceeds in the unlocking rotation direction (the leading end in the clockwise direction as viewed in the drawing). As a result, when the cam 34R is rotated in the unlocking rotation direction, the second pawls 31R to 33R, the second pawl groove cam portions 44R of which are pressed by the engaging protrusions 52R, are retracted radially inward.

The cam 34R is urged by the urging force of the spiral spring 35 in the locking rotation direction (the counterclockwise direction as viewed in FIG. 12) relative to the first member 10R such that the cam surface 51R presses the second pawls 31R to 33R radially outward. In this manner, the outer teeth 43 of the second pawls 31R to 33R become meshed with the inner teeth 22 of the second member 20R.

When the second pawls 31R to 33R move radially outward in the corresponding guide grooves 15, that is, when the outer teeth 43 of the second pawls 31R to 33R are meshed with the inner teeth 22, each second pawl engaging projection 46R is located between the corresponding adjacent pair of the engaging projections 24R, or, in other words, on the corresponding second locking engaging surface 27.

Then, as shown in FIG. 13, when the cam 34R is operated in accordance with unlocking operation and the second pawls 31R to 33R move radially inward in the corresponding guide grooves 15, that is, when the outer teeth 43 of the second pawls 31R to 33R are separated from the inner teeth 22, each engaging projection 24R is constantly partially overlapped with the corresponding second pawl engaging projection 46R, which is located on the second locking engaging surface 27, at a radial position.

As a result, the second pawl engaging projections 46R are permitted to rotate relative to the second member 20R each in the range corresponding to the corresponding second locking engaging surface 27. The unlocking operation of the cam 34R at this time is referred to also as a first unlocking operation.

When the second member 20R is rotated in the clockwise direction as viewed in the drawing relative to the first member 10R with the outer teeth 43 and the inner teeth 22 separated from one another, rotation of the second member 20R is restricted by the engaging projections 24R when the engaging projections 24R reach the corresponding second pawl engaging projections 46R. Rotation of the second member 20R relative to the first member 10R at this time is forward rotation.

When the second member 20R is rotated in the counterclockwise direction as viewed in the drawing relative to the first member 10R with the outer teeth 43 and the inner teeth 22 separated from one another, rotation of the second member 20R is restricted by the engaging projections 24R when the engaging projections 24R reach the corresponding second pawl engaging projections 46R. Rotation of the second member 20R relative to the first member 10R at this time is rearward rotation.

Figure 14:
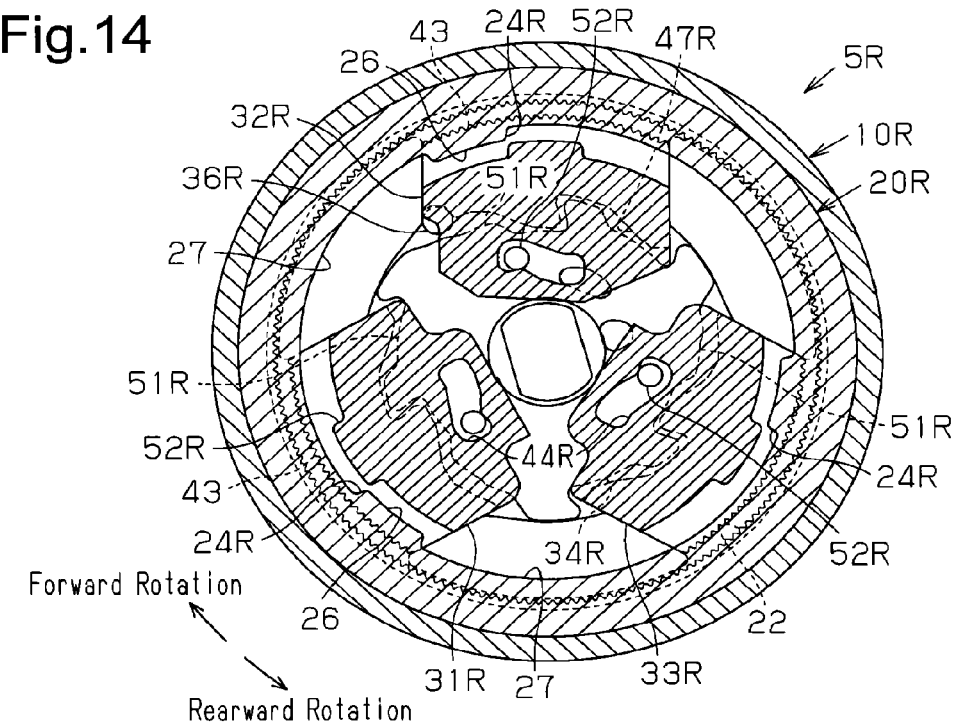
FIG. 14 is a cross-sectional view showing a state of a second unlocking operation of the lock mechanism.

As shown in FIG. 14, when the cam 34R is operated in accordance with unlocking operation and the second pawls 31R to 33R further move radially inward in the corresponding guide grooves 15, which is when the outer teeth 43 of the second pawls 31R to 33R are separated from the inner teeth 22, each engaging projection 24R does not become overlapped with the second pawl engaging projection 46R, which is located on the corresponding second locking engaging surface 27, at a radial position.

Therefore, at this time, by being released from radial engagement between the engaging projections 24R and the second pawl engaging projections 46R, the second member 20R is permitted to, for example, rotate relative to the second pawls 31R to 33R further in the clockwise direction as viewed in the drawing, or, in other words, rotate relative to the first member 10R further in the clockwise direction.

As a result, when, in this state, the second member 20R starts to rotate forward relative to the first member 10R, the second pawl engaging projections 46R, which have been located on the corresponding second locking engaging surfaces 27, are moved from the second locking engaging surfaces 27 onto the second unlocking engaging surfaces 26. At this time, radially outward movement of the second pawls 31R to 33R, which are in a state separated from the inner teeth 22, is restricted by the second unlocking engaging surfaces 26, onto which the second pawl engaging projections 46R have been moved. In this manner, the second pawls 31R to 33R are maintained in the state separated from the inner teeth 22. As a result, forward rotation of the second member 20R at this time is permitted until the second member 20R reaches the rotating position corresponding to the forward inclined position of the seat back. The unlocking operation of the cam 34R at this time is referred to as a second unlocking operation.

Therefore, when the seat back is raised to cancel its forward inclination, the second member 20R rotates rearward. Then, once the second locking engaging surfaces 27 reach the corresponding second pawl engaging projections 46R, the second pawls 31R to 33R can be meshed with the inner teeth 22. However, to mesh the second pawls 31R to 33R with the inner teeth 22, the first pawls 31L to 33L at the opposite side, which cooperate with the second pawls 31R to 33R through the coupling shaft 92, must be adapted to be meshed with the inner teeth 22. That is, operation of the second pawls 31R to 33R with the inner teeth 22 is restricted by operation of the first pawls 31L to 33L on the opposite side related to return to the memory position. In other words, even if only the lock mechanism 5L on one side has a function related to the return to the memory position, functioning as the device as a whole is ensured. Then, when the second pawls 31R to 33R are meshed with the inner teeth 22 together with the first pawls 31L to 31L, further rearward rotation of the second member 20R is restricted. Obviously, the rotating position of the second member 20R relative to the first member 10R at this time coincides with the rotating position corresponding to the memory position or the reference point returning position of the seat back.

As shown in FIG. 1, the distal end section of the hinge shaft 91R projecting from the lower plate 4R on one side in the axial direction is linked to a first manipulating member 71, which is configured by, for example, a plate. When the distal end section of the first manipulating member 71 is raised (hereinafter, referred to as "a first unlocking manipulation"), the cam 34R, which is coupled to the hinge shaft 91R, is rotated in the direction corresponding to the first unlocking operation. At this time, the cam 34L on the opposite side is also rotated in the direction corresponding to the first unlocking operation through the coupling shaft 92 and the hinge shaft 91L.

A shoulder section of an upper left section of the seat back frame 6 as viewed in FIG. 1 has an attachment member 6b, which extends in a corner section of the shoulder section. An arm-shaped second manipulating member 72, which is configured by, for example, a plate, is supported by the attachment member 6b to be rotational in the up-and-down direction through a shaft 73. The second manipulating member 72 is constantly urged downward by a returning spring (not shown). The attachment member 6b has stoppers 74a, 74b, which are arranged on an upper side and a lower side of the second manipulating member 72. The manipulation range of the second manipulating member 72 is defined by the stoppers 74a, 74b.

The distal end section of the hinge shaft 91L projecting from the lower plate 4L on one side is linked to a release link 100, which is configured by, for example, a plate. The distal end section of the release link 100 is coupled to a middle section of the second manipulating member 72 in the longitudinal direction through a cable 75, which is guided by an outer tube T of a double-tube type flexible cable, for example. When the distal end section of the second manipulating member 72 is raised (hereinafter, referred to as "a second unlocking manipulation"), the cam 34L, which is coupled to the hinge shaft 91L, is rotated in the direction corresponding to the second unlocking operation. At this time, the cam 34R on the opposite side is also rotated in the direction corresponding to the second unlocking operation through the coupling shaft 92 and the hinge shaft 91R.

A terminal of the outer tube T of the cable 75 is maintained by a cable holder 6c located in the attachment member 6b. The opposite terminal of the outer tube T is maintained by a cable holder 104 fixed to the lower plate 4L. In FIG. 1, illustration of a middle section of the cable 75 and a middle section of the outer tube T is omitted.

Figure 15:
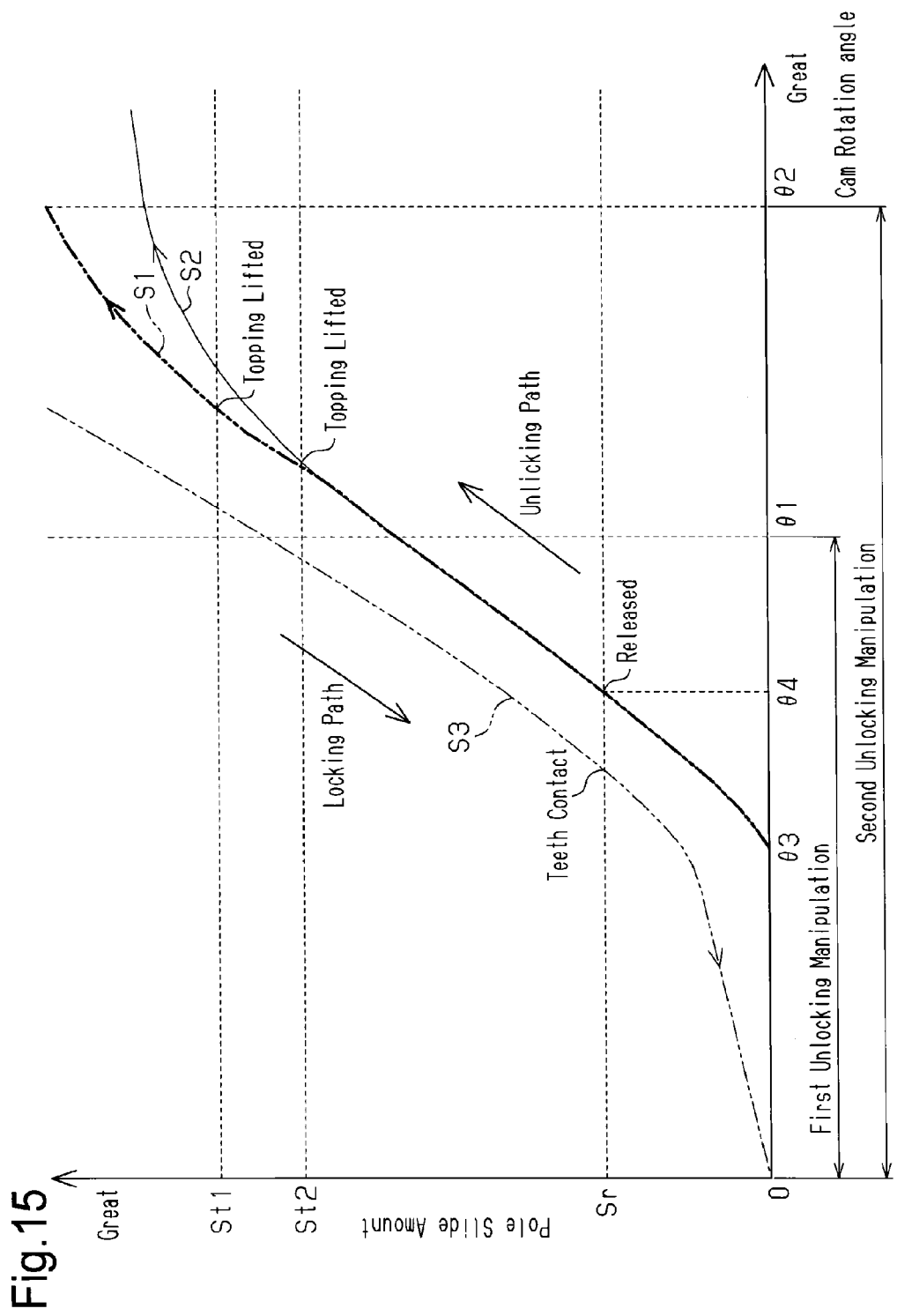
FIG. 15 is a graph representing the relationship between the rotation angle of a cam and the slide amount of a pawl.

As shown in FIG. 15, the relationship between the rotation angle $\theta$ of each cam 34L, 34R with respect to the base point defined by the rotation angle of the cam 34L, 34R at the time the outer teeth 43 of the associated first or second pawl 31L, pawl 31R are meshed with the inner teeth 22 of the corresponding second member 20L, 20R and the corresponding slide amount SL, which is the movement amount of the associated one of the first and second pawls 31L, 31R in the radial direction separating from the inner teeth 22. Since the other ones of the pawls, which are the first pawls 32L and 33L and the second pawls 32R and 33R, cooperate with the corresponding first and second pawls 31L, 31R, description of the other pawls is omitted herein.

In FIG. 15, the rotation angle $\theta1$ represents the rotation angle $\theta$ corresponding to the maximum manipulation amount of the first manipulating member 71 in the first unlocking manipulation. The rotation angle $\theta2$ ($\theta2>\theta1$) represents the rotation angle $\theta$ corresponding to the maximum manipulation amount of the second manipulating member 72 in the second unlocking manipulation. The rotation angle $\theta2$ thus coincides with the rotation angle $\theta$ of the cam 34L corresponding to such a manipulation amount that the second manipulating member 72 contacts the stopper 74a. The slide amount S1 represents variation of the slide amount SL of the first pawl 31L in the second unlocking operation of the cam 34L, 34R. The slide amount S2 represents variation of the slide amount SL of the second pawl 31R in the second unlocking operation of the cam 34L, 34R.

The rotation angle θ3 represents the rotation angle θ by which the engaging protrusions 52L and 52R come into contact with the first pawl engaging projection 46L and the second pawl engaging projection 46R, respectively, via a free rotation zone. The rotation angle θ4 represents the rotation angle θ corresponding to the slide amount Sr by which the outer teeth 43 of each of the first and second pawls 31L, 31R is separated from the inner teeth 22 of the corresponding one of the second members 20L, 20R.

The slide amount S3 represents variation of the slide amount SL of each of the first and second pawls 31L, 31R by which the outer teeth 43 of the first or second pawl 31L, 31R become meshed with the inner teeth 22 of the corresponding second member 20L, 20R using the urging force of the spiral spring 35. That is, when the outer teeth 43 of the first pawl 31L and the second pawl 31R become meshed with the inner teeth 22 of the corresponding second members 20L, 20R, the slide amounts SL of the first pawl 31L and the second pawl 31R vary in similar manners. Such variation of the slide amounts SL is adjusted and set by means of the shapes of the cam surfaces 51L, 51R of the cams 34L, 34R and the shapes of the inner surface cam portions 45L, 45R of the first and second pawls 31L, 31R.

As is clear from FIG. 15, the slide amounts S1 and S2 are set such that the slide amounts SL vary in similar manners at an initial stage from when the cams 34L, 34R starts to perform the second unlocking operation to when the outer teeth 43 of the first pawl 31L and the second pawl 31R are separated from the inner teeth 22 of the corresponding second members 20L, 20R.

The slide amounts S1, S2 are set such that the slide amounts SL start to vary in different manners from when the second pawl engaging projection 46R of the second pawl 31R is moved onto the second unlocking engaging surface 26.

That is, the slide amount St1 by which the first pawl engaging projection 46L of the first pawl 31L is moved onto the first unlocking engaging surface 62 of the memory ring 60 is set greater than the slide amount St2 by which the second pawl engaging projection 46R of the second pawl 31R is moved onto the second unlocking engaging surface 26 of the second member 20R. This reduces the likelihood that the rotation angle 19 (the manipulation amount of the first manipulating member 71) at which the first pawl engaging projection 46L of the first pawl 31L is moved onto the first unlocking engaging surface 62 of the memory ring 60 will become small due to variation in components, for example, than the rotation angle (the manipulation amount of the second manipulating member 72) at which the second pawl engaging projection 46R of the second pawl 31R is moved onto the second unlocking engaging surface 26 of the second member 20R. This restrains forward inclination of the seat back beyond the aforementioned predetermined angular range from being hindered, even if the memory ring 60 is being rotated integrally with the second member 20L, that is, even if setting of the memory position is being performed, in the state of the second unlocking manipulation.

In the range from the rotation angle θ, at which the second pawl engaging projection 46R of the second pawl 31R is moved onto the second unlocking engaging surface 26 of the second member 20R, the increase amount of the slide amount S1 of the first pawl 31L with respect to the increase amount of the rotation angle θ is greater than the slide amount S2 of the second pawl 31R. That is, the movement speed of the first pawl 31L when moving away from the inner teeth 22 in the radial direction is greater than the movement speed of the second pawl 31R when moving away from the inner teeth 22 in the radial direction. In this manner, although the slide amount St1 at which the first pawl engaging projection 46L of the first pawl 31L is moved onto the first unlocking engaging surface 62 of the memory ring 60 is greater than the slide amount St2 at which the second pawl engaging projection 46R of the second pawl 31R is moved onto the second unlocking engaging surface 26 of the second member 20R, the difference between the times of such movement is restrained by the difference between the movement speed of the first pawl 31L and the movement speed of the second pawl 31R. This restrains integral rotation of the memory ring 60 with the second member 20L, that is, setting of the memory position from being hindered even if the seat back is inclined forward beyond the aforementioned predetermined angular range in the state of the second unlocking manipulation.

Figure 16:
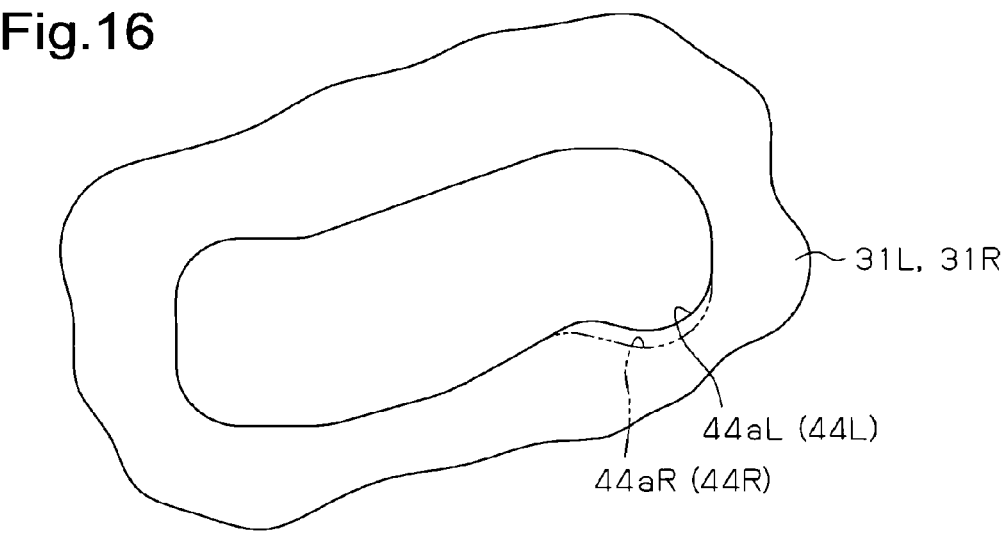
FIG. 16 is a diagram illustrating first and second pawl groove cam portions in comparison.

As shown in FIG. 16, variation of the slide amount SL at which the first pawl engaging projection 46L of the first pawl 31L is moved onto the first unlocking engaging surface 62 of the memory ring 60 and variation of the slide amount SL at which the second pawl engaging projection 46R of the second pawl 31R is moved onto the second unlocking engaging surface 26 of the second member 20R are adjusted and set by means of the shapes of the first pawl groove cam portion 44L and the second pawl groove cam portion 44R, each of which receives the engaging protrusion 52L, 52R of the corresponding cam 34L, 34R. That is, an inner wall surface 44aL of the first pawl groove cam portion 44L, which is related to retraction of the first pawl 31L at a point close to the point at which the second pawl engaging projection 46R of the second pawl 31R is moved onto the second unlocking engaging surface 26 of the second member 20R, as represented by the solid curve in FIG. 16, is enlarged radially outward compared to an inner wall surface 44aR of the second pawl groove cam portion 44R, which is related to the second pawl 31R, as represented by the long dashed double-short dashed curve in FIG. 16. This ensures relative increase of the movement speed of the first pawl 31L when moving away from the inner teeth 22 in the radial direction.

The first manipulating member 71 and the structure in the vicinity of the first manipulating member 71 will hereafter be described.

Figure 17:
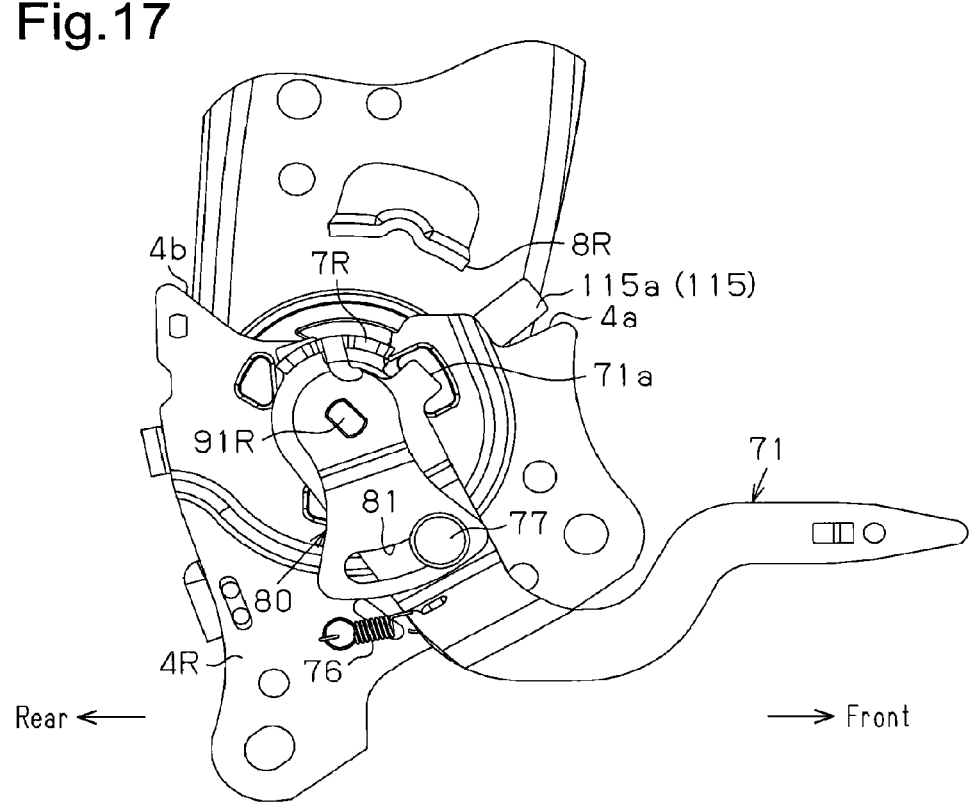
FIG. 17 is a side view showing a first manipulating member and the structure in the vicinity of the first manipulating member when the first manipulating member and a second manipulating member are in a non-manipulated state.

As illustrated in FIG. 17, the first manipulating member 71 is substantially bow-shaped and rotationally supported by the distal end section of the hinge shaft 91R. The first manipulating member 71 has a movable stopper 71a, which projects from the basal end section of the first manipulating member 71 forward and upward substantially in the radial direction about the hinge shaft 91R. The movable stopper 71a is arranged forward in the clockwise direction about the hinge shaft 91R as viewed in FIG. 17 relative to the fixed flange 7R such that the rotation path of the movable stopper 71a is blocked by the fixed flange 7R. The first manipulating member 71 is urged and maintained (pulled) by a returning spring 76, which is arranged between the first manipulating member 71 and the lower plate 4R, at a predetermined initial rotation position.

Figure 18:
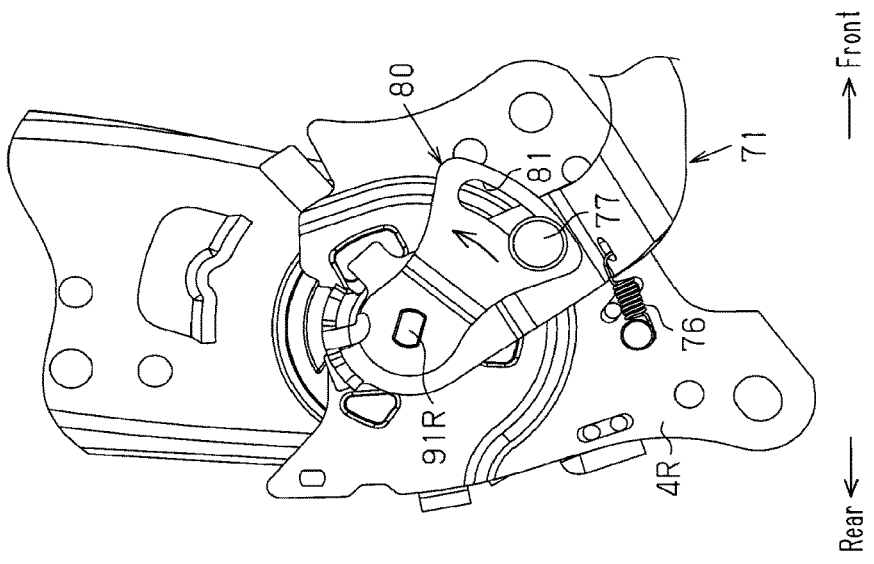
FIG. 18 is a side view showing the first manipulating member and the structure in the vicinity of the first manipulating member when the first manipulating member is in a state of a first unlocking manipulation.

As a result, as shown in FIG. 18, the maximum rotation range of the first manipulating member 71 when raising the distal end section of the first manipulating member 71 (the first unlocking manipulation) is limited to the range at the end of which the movable stopper 71a contacts the fixed flange 7R. The rotation angle θ corresponding to the manipulation amount of the first manipulating member 71 at this time coincides with the rotation angle θ1.

As illustrated in FIG. 17, the distal end section of the hinge shaft 91R is inserted through and fixed to a link member 80, which is configured by a plate, at a position adjacent to an outer side of the first manipulating member 71 in a lower side of the fixed flange 7R. An arcuate elongated hole 81, which extends about the hinge shaft 91R, is located in the distal end section of the link member 80. A pin 77, which is slidably inserted through the elongated hole 81, is fixed to the first manipulating member 71.

As has been described, the first manipulating member 71 is rotationally supported by the distal end section of the hinge shaft 91R and urged and maintained at the predetermined initial rotation position by the returning spring 76. The link member 80 is arranged at such a position that an end section (a front end section) of the elongated hole 81 is stopped by the pin 77 of the first manipulating member 71, which is normally located at the initial rotation position through constant urging of the cam 34R, which is integral with the hinge shaft 91R, by the spiral spring 35 in the rotation direction corresponding to locking operation (the clockwise direction as viewed in FIG. 17).

As a result, as shown in FIG. 18, when the first manipulating member 71 is in the state of the first unlocking manipulation, the end section (the front end section) of the elongated hole 81 is pressed by the pin 77 to rotate the link member 80 integrally with the first manipulating member 71 in the counterclockwise direction as viewed in the drawing. As the link member 80 rotates, the hinge shaft 91R rotates in the same direction integrally with the link member 80. At this time, the cam 34R, which is integral with the hinge shaft 91R, performs the first unlocking operation against the urging force of the spiral spring 35.

Figure 19:
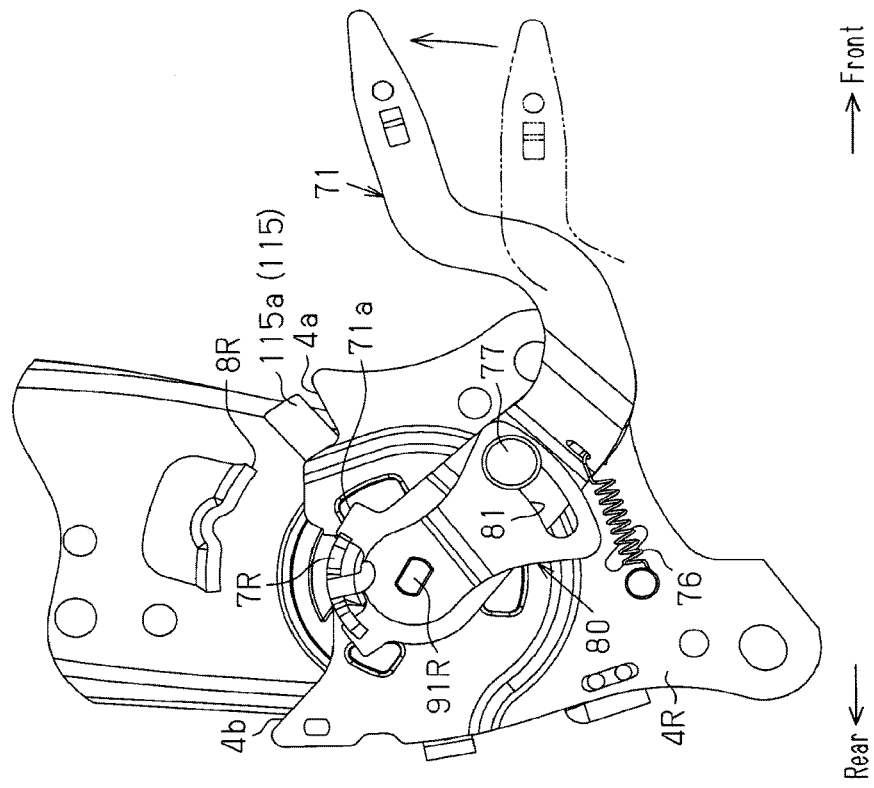
FIG. 19 is a side view showing the first manipulating member and the structure in the vicinity of the first manipulating member when the second manipulating member is in a state of a second unlocking manipulation.

In contrast, when the link member 80 rotates in the counterclockwise direction as viewed in FIG. 17 in the state illustrated in the drawing, movement of the pin 77 in the elongated hole 81 is permitted as shown in FIG. 19 to prevent rotation of the link member 80 from being transmitted to the first manipulating member 71.

The release link 100 and the structure in the vicinity of the release link 100 will hereafter be described.

Figure 20:
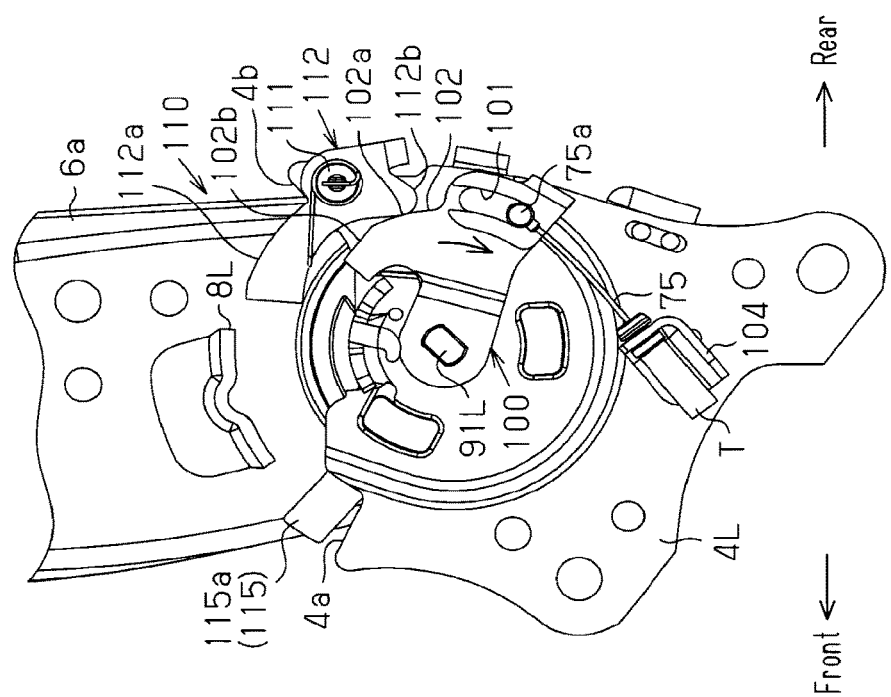
FIG. 20 is a side view showing a release link and the structure in the vicinity of the release link when the first and second manipulating members are in non-manipulated states.

As illustrated in FIG. 20, the release link 100 substantially has an L shape. The distal end section of the hinge shaft 91L is inserted through and fixed to the release link 100. That is, since the cam 34L, which is integral with the hinge shaft 91L, is constantly urged in the rotation direction corresponding to locking operation (the counterclockwise direction as viewed in FIG. 20) by the spiral spring 35, the release link 100, together with these components, is normally maintained at a predetermined initial rotation position. An arcuate elongated hole 101 extending about the hinge shaft 91L is located in the distal end section of the release link 100. A terminal 75a of the cable 75 extending from the second manipulating member 72 is slidably inserted through the elongated hole 101. When the release link 100 is maintained at the initial rotation position, the terminal 75a of the cable 75 is located in an end section (the lower end section) of the elongated hole 101. The cable holder 104, which maintains the corresponding terminal of the outer tube T, is fixed to a lower end section of the lower plate 4L.

When the second manipulating member 72 is in the state of the second unlocking manipulation and the cable 75 is pulled downward, the end section (the lower end section) of the elongated hole 101 is pressed by the terminal 75a such that the release link 100 rotates in the clockwise direction as viewed in FIG. 20. As the release link 100 rotates, the hinge shaft 91L rotates in the same direction integrally with the release link 100. At this time, the cam 34L, which is integral with the hinge shaft 91L, performs the second unlocking operation against the urging force of the spiral spring 35. In contrast, when the release link 100 rotates in the clockwise direction as viewed in the drawing, movement of the terminal 75a in the elongated hole 101 is permitted to prevent rotation of the release link 100 from being transmitted to the cable 75 or the second manipulating member 72.

That is, when the first manipulating member 71 is manipulated in accordance with the first unlocking manipulation and the hinge shaft 91R, the coupling shaft 92, and the hinge shaft 91L rotate together with the link member 80, the release link 100 rotates integrally with these components. At this time, as has been described, by permitting movement of the terminal 75a in the elongated hole 101, rotation of the release link 100 is prevented from being transmitted to the second manipulating member 72.

When the second manipulating member 72 is manipulated in accordance with the second unlocking manipulation and the hinge shaft 91R, the coupling shaft 92, and the hinge shaft 91L rotate together with the release link 100, the link member 80 rotates integrally with these components. At this time, as has been described, by permitting movement of the pin 77 in the elongated hole 81, rotation of the link member 80 is prevented from being transmitted to the first manipulating member 71.

As has been described, swinging of one of the first and second manipulating members 71, 72 caused by unlocking manipulation of the other one of the first and second manipulating members 71, 72 is restrained.

A substantially bow-shaped switch piece 102, which extends upward in a circumferential direction about the hinge shaft 91L, is located in a middle section of the release link 100 in the longitudinal direction. The outer circumferential surface of the basal end section of the switch piece 102 configures a circular operation restricting surface 102a serving as a first cam surface extending on a circle about the hinge shaft 91L. The outer circumferential surface of the distal end section of the switch piece 102 configures a substantially linear operation permitting surface 102b, which extends radially inward toward the distal end of the operation permitting surface 102b compared to the imaginary circle on which the operation restricting surface 102a is extended. The switch piece 102 configures a stopper mechanism 110, which restricts reclining of the seat back at the reference point returning position (a predetermined regulating angular position) when the seat back is in the seating range and the second manipulating member 72 is manipulated in accordance with the second unlocking manipulation.

Figure 22:
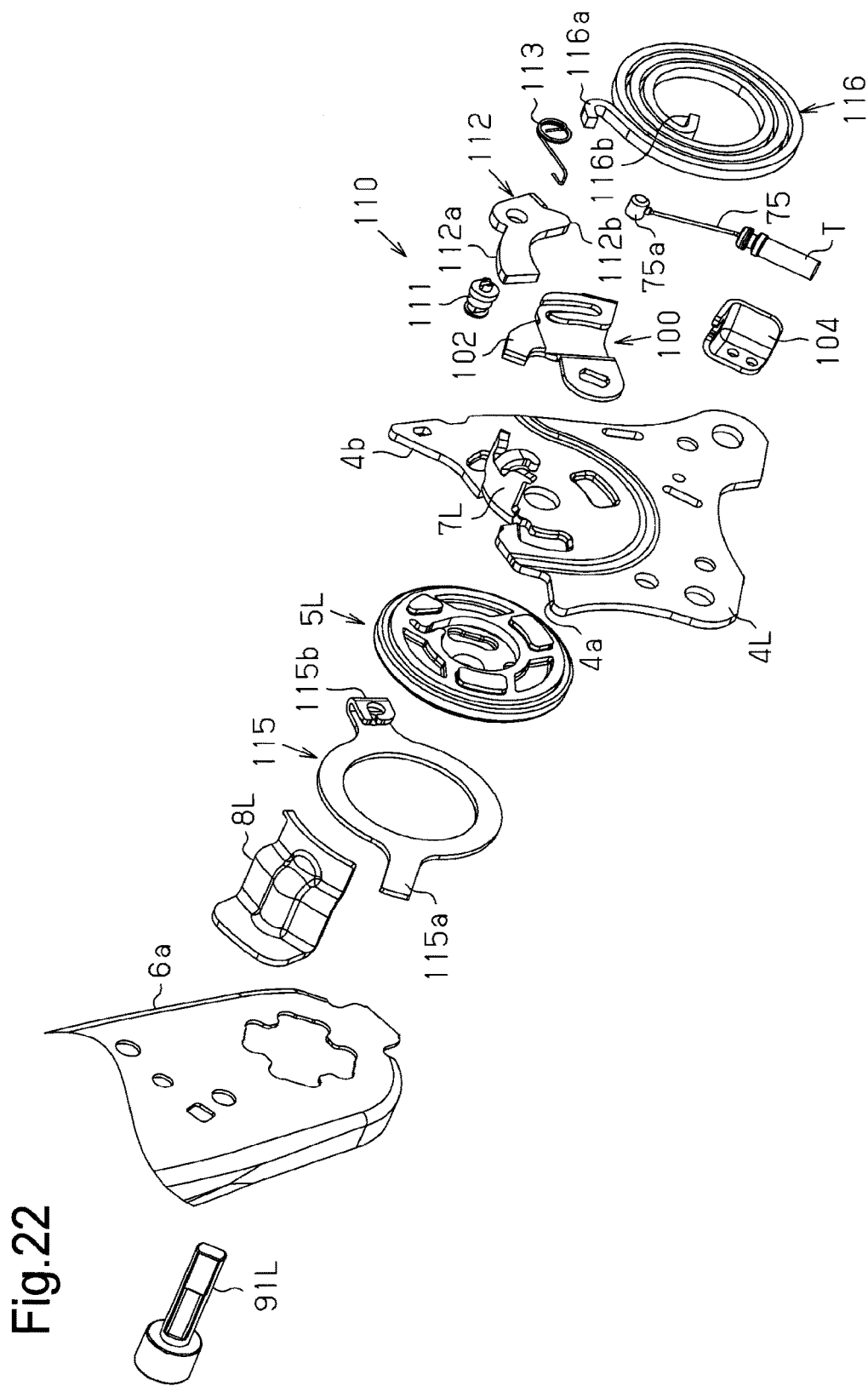
FIG. 22 is an exploded perspective view showing a stopper mechanism.

That is, as also shown in FIG. 22, the stopper mechanism 110 includes the movable flange 8L, the switch piece 102, a stopper link 112, and a stopper link urging member 113. The stopper link 112 is rotationally coupled to an upper rear section of the lower plate 4L (the vicinity of the rear stopper 4b) at a position above the switch piece 102 through the pin 111.

The stopper link 112 is configured by, for example, a plate and has a substantially bow-shaped stopper piece 112a and a substantially round engaging surface 112b serving as a second cam surface. The stopper piece 112a extends toward the movable flange 8L substantially in a circumferential direction about the hinge shaft 91L. The engaging surface 112b extends downward toward the release link 100 (the switch piece 102). Basically, when the stopper link 112 rotates in the clockwise direction as viewed in FIG. 22 about the pin 111, the engaging surface 112b comes into contact with the outer circumferential surface of the switch piece 102, thus restricting further rotation of the stopper link 112.

The stopper link urging member 113 is configured by, for example, a torsion coil spring. A terminal of the stopper link urging member 113 is stopped by the pin 111, which is fixed to the lower plate 4L. The opposite terminal of the stopper link urging member 113 is stopped by the stopper piece 112a. The stopper link urging member 113 thus urges the stopper link 112 to such a side that the stopper link 112 rotates about the pin 111 in the clockwise direction as viewed in FIG. 22.

Operation of the stopper mechanism 110 will hereafter be described.

Figures 23A, 23B, 23C:
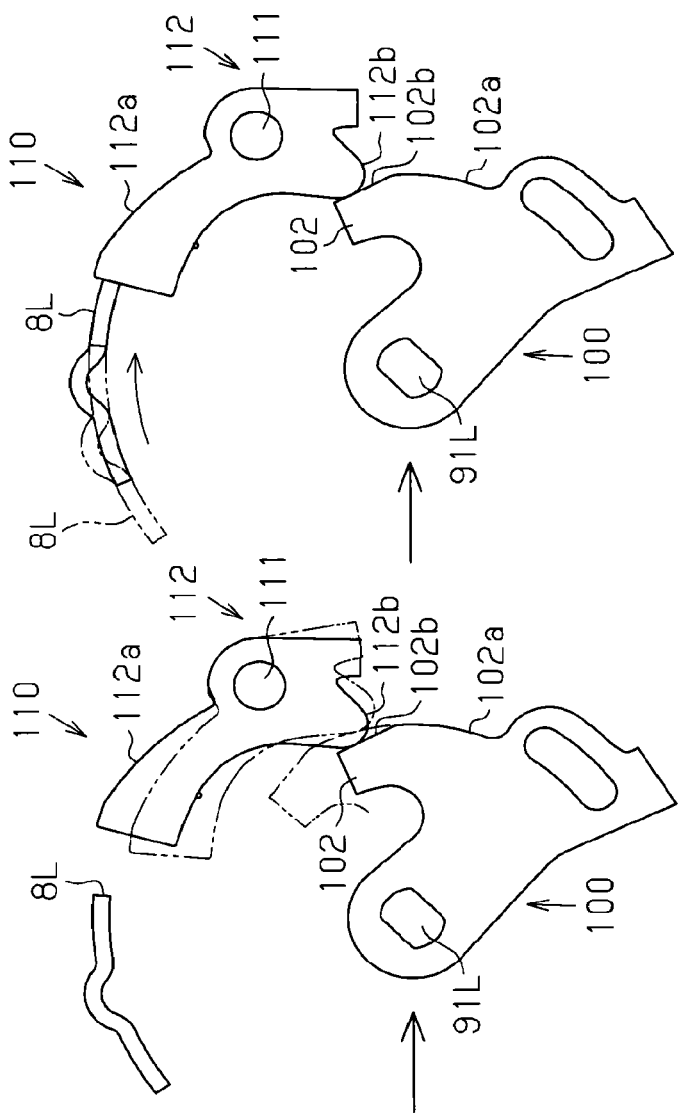
FIGS. 23A, 23B, and 23C are diagrams illustrating operation of the stopper mechanism when a seat back is in a seating range.

In FIG. 23A, the second manipulating member 72 is in a non-manipulated state and the release link 100 is maintained at the initial rotation position. The seat back is arranged in the seating range and inclined relatively forward. At this time, the stopper link 112, which is urged by the stopper link urging member 113, contacts the operation restricting surface 102a of the switch piece 102 by means of the engaging surface 112b. The stopper link 112 is thus pressed in a relative manner by the operation restricting surface 102a of the engaging surface 112b outward in the radial direction about the hinge shaft 91L. This causes the stopper piece 112a to approach the hinge shaft 91L. The outer circumferential surface of the stopper piece 112a is thus extended substantially in a circumferential direction about the hinge shaft 91L and arranged radially inward from the movable flange 8L.

Further, the movable flange 8L is located forward with respect to the seat compared to the front end of the stopper piece 112a, thus ensuring an open space above the stopper piece 112a.

As shown in FIG. 23B, when the second manipulating member 72 is in the state of the second unlocking manipulation and the release link 100 is rotated in the clockwise direction as viewed in the drawing, the operation permitting surface 102b of the switch piece 102 reaches the engaging surface 112b of the stopper link 112 such that the operation restricting surface 102a of the switch piece 102 releases the engaging surface 112b of the stopper link 112. As a result, the stopper piece 112a of the stopper link 112, which is urged by the stopper link urging member 113, projects to block the rotation path of the movable flange 8L.

As a result, as shown in FIG. 23C, even if the seat back is reclined in this state, inclination of the seat back is restricted once the movable flange 8L comes into contact with the stopper piece 112a. At this time, the seat back is set at the reference point returning position.

The stopper piece 112a, which has been projected to block the rotation path of the movable flange 8L due to the second unlocking manipulation of the second manipulating member 72, is re-pressed by the operation restricting surface 102a, which proceeds toward the stopper piece 112a when the second manipulating member 72 is released and the release link 100 is rotated in the counterclockwise direction as viewed in the drawing. The outer circumferential surface of the stopper piece 112a is thus arranged substantially in a circumferential direction about the hinge shaft 91L and located radially inward from the movable flange 8L. In other words, the urging force of the spiral spring 35, which causes the cam 34L to perform locking operation, is set sufficiently greater than the urging force of the stopper link urging member 113.

In FIG. 24A, the second manipulating member 72 is in a non-manipulated state and the release link 100 is maintained at the initial rotation position. The seat back is in the non-seating range and relatively reclined. At this time, the movable flange 8L is arranged above the stopper piece 112a and restricts rotation of the stopper link 112 about the pin 111 of the stopper link 112 in the clockwise direction as viewed in the drawing.

As illustrated in FIG. 24B, when the second manipulating member 72 is in the state of the second unlocking manipulation, the release link 100 rotates in the clockwise direction as viewed in the drawing with the stopper link 112, which is restricted from rotating by the movable flange 8L and remains at the current position.

As a result, as shown in FIG. 24C, the stopper piece 112a continuously opens the rotation path of the movable flange 8L. The seat back is thus reclined until the movable flange 8L comes into contact with the rear stopper 4b, or, in other words, reaches the greatly reclined position.

Figure 21:
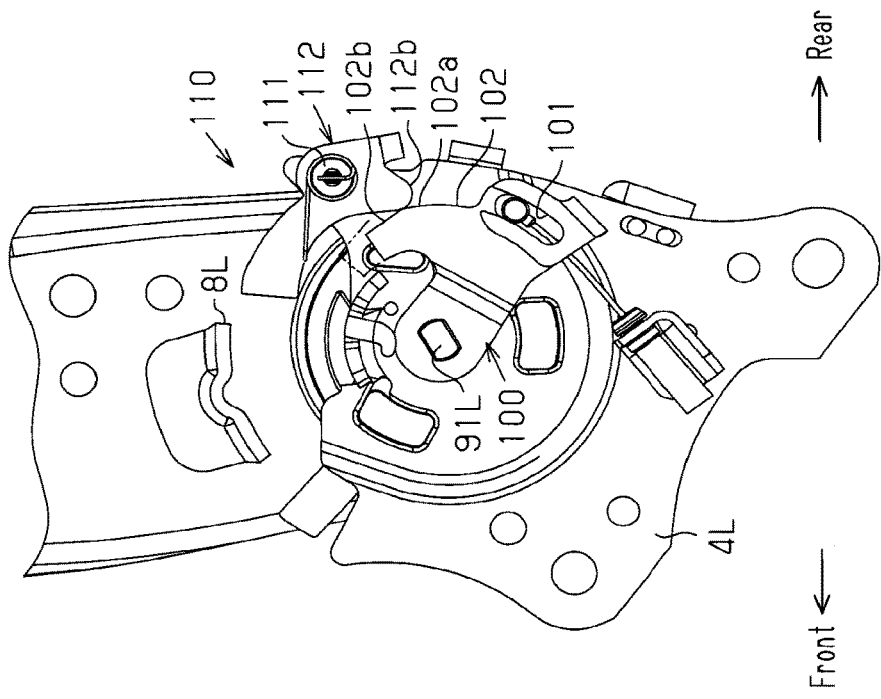
FIG. 21 is a side view showing the release link and the structure in the vicinity of the release link when the first manipulating member is in the state of a first unlocking manipulation.

As illustrated in FIG. 21, the release link 100 rotates in the clockwise direction as viewed in the drawing also when the first manipulating member 71 is in the state of the first unlocking manipulation. However, the manipulation amount of the first manipulating member 71 at this time is relatively small. The release link 100 (the switch piece 102) thus slidably contacts the engaging surface 112b of the stopper link 112 in the range corresponding to the operation restricting surface 102a. As a result, regardless of the state of the seat back (regardless of whether the seat back is in the seating range or the non-seating range), the stopper piece 112a of the stopper link 112 does not block the rotation path of the movable flange 8L. That is, when the first manipulating member 71 is in the state of the first unlocking manipulation, angle adjustment of the seat back in the adjustment range is enabled without being interfered by the stopper mechanism 110.

As shown in FIG. 22, a transmission ring 115, which is arranged between the back side frame 6a and the lock mechanism 5L, has a pressed piece 115a, which is arranged on an upper front side and extended in the radial direction, and a cable coupling portion 115b, which is arranged on a rear side and extended in the radial direction.

The pressed piece 115a is arranged in the rotation path in which the movable flange 8L rotates when the seat back is inclined forward. When the seat back is inclined forward, the movable flange 8L presses the pressed piece 115a of the transmission ring 115, thus causing integral rotation of the transmission ring 115. The cable coupling portion 115b is coupled to the aforementioned slide lock device through a cable (not shown). When the seat back is inclined toward the forward inclined position, the transmission ring 115 is rotated to unlock the slide lock device. As a result, the seat cushion is slid forward relative to the vehicle floor.

A spiral spring 116, which is shown in a lower right section of FIG. 22, urges the seat back to incline forward relative to the aforementioned seat cushion. An outer end section 116a of the spiral spring 116 is stopped by the movable flange 8L. An inner end section 116b of the spiral spring 116 is stopped by the fixed flange 7L.

Another transmission ring 115 and another spiral spring 116 are arranged on the opposite side of the seat.

Operation of the present embodiment will now be described.

When the boundary position (the restricting surface 66) between the first unlocking engaging surface 62 and the first locking engaging surface 65 of the memory ring 60 is located at the first pawl engaging projection 46L of the first pawl 31L, the outer teeth 43 of the first pawl 31L can be meshed with the inner teeth 22. The first pawl 31L is urged by the spiral spring 35 through the cam 34L, thus meshing the outer teeth 43 with the inner teeth 22. This restricts inclination of the seat back relative to the seat cushion.

When the first manipulating member 71 is in the state of the first unlocking manipulation, the first pawl 31L is retracted radially inward by the cam 34L to separate the outer teeth 43 from the inner teeth 22. This permits inclination of the seat back relative to the seat cushion. Also, when the first manipulating member 71 is in the state of the first unlocking manipulation, the boundary position between the first unlocking engaging surface 62 and the first locking engaging surface 65 of the memory ring 60 is located at the first pawl engaging projection 46L of the first pawl 31L. The boundary position between the first unlocking engaging surface 62 and the first locking engaging surface 65 of the memory ring 60 thus becomes partially engaged in the radial direction with the first pawl engaging projection 46L, thus restricting movement of the first pawl engaging projection 46L from the first locking engaging surface 65 onto the first unlocking engaging surface 62. The memory ring 60 thus rotates integrally with the first member 10L when the first member 10L and the second member 20L rotate relative to each other.

At this stage, relative rotation of the first member 10L and the second member 20L is limited to a predetermined rotation range in which rotation of the engaging projection 24L is permitted by the rotation permitting portion 61 of the memory ring 60, which is substantially fixed to the first member 10L. This also limits inclination of the seat back to a predetermined angular range corresponding to the rotation range, which is the adjustment range. That is, the seat back is adjusted and maintained at any angular position as long as the position is in the aforementioned predetermined angular range (the adjustment range).

When the seat back is in the adjustment range and the second manipulating member 72 is in the state of the second unlocking manipulation, the first pawl 31L is retracted radially inward by the cam 34L to separate the outer teeth 43 from the inner teeth 22. This permits inclination of the seat back relative to the seat cushion.

At this time, the memory ring 60 is disengaged in the radial direction from the first pawl engaging projection 46L. The first pawl engaging projection 46L is thus permitted to be moved from the first locking engaging surface 65 onto the first unlocking engaging surface 62. Also, relative rotation of the first pawl 31L (the first member 10L), the first pawl engaging projection 46L of which is moved onto the first unlocking engaging surface 62, and the memory ring 60 is permitted. Further, the memory ring 60 rotates integrally with the second member 20L through friction engagement with the second member 20L, which is caused by elastic deformation of the memory ring 60. That is, when the second manipulating member 72 is in the state of the second unlocking manipulation, the second member 20L and the memory ring 60 rotate integrally as the seat back is inclined forward from the angular position corresponding to the second unlocking manipulation.

At this time, the first pawl 31L, the first pawl engaging projection 46L of which is on the first unlocking engaging surface 62, cannot mesh the outer teeth 43 with the inner teeth 22. That is, when the second manipulating member 72 is in the state of the second unlocking manipulation, the seat back, which is permitted to incline relative to the seat cushion, can be inclined forward beyond the adjustment range while being maintained in the state in which the seat back is permitted to incline relative to the seat cushion.

When the first locking engaging surface 65 reaches the first pawl engaging projection 46L of the first pawl 31L, or, in other words, returns to the original angular position of the second unlocking manipulation (the memory position), inclination of the seat back, which has been permitted to incline, can be restricted. That is, inclination of the seat back, which has been inclined forward beyond the adjustment range with the second manipulating member 72 maintained in the state of the second unlocking manipulation, is restricted when such forward inclination of the seat back is canceled and the seat back is returned to the memory position. This ensures return of the angular position of the seat back to the memory position.

As illustrated in FIG. 5B, the engaging projection 24L of the second member 20L (the accommodating recess 23) related to setting of the adjustment range of the seat back and the first pawl engaging projection 46L of the first pawl 31L related to setting of the memory position, in particular, are arranged to be at least partially overlapped with the axial position of the memory ring 60 such that the engaging projection 24L and the first pawl engaging projection 46L can be engaged with the memory ring 60 in the radial direction. This restrains size enlargement in the axial direction compared to, for example, a case in which the engaging projection 24L of the second member 20L is arranged offset from the axial position of the memory ring 60 and setting of the adjustment range of the seat back is performed independently from the memory ring 60.

Forward inclination of the seat back beyond the predetermined angular range (the adjustment range) with the second manipulating member 72 maintained in the state of the second unlocking manipulation is restricted at a predetermined forward inclined position by the front stopper 4a and the movable flanges 8L, 8R (the front stopper mechanism). Therefore, when the seat back is inclined forward with the second manipulating member 72 maintained in the state of the second unlocking manipulation, the more reclined the angular position at the time of the second unlocking manipulation, the greater the inclination amount of the seat back becomes. Therefore, when the first pawl engaging projection 46L is moved onto the first unlocking engaging surface 62 with the second manipulating member 72 maintained in the state of the second unlocking manipulation, the more reclined the angular position of the seat back at the time of the second unlocking manipulation, the greater the amount of relative rotation (angle) of the first pawl engaging projection 46L becomes.

If the relative rotation amount (angle) of the first pawl engaging projection 46L corresponding to the inclination amount of the seat back that is inclined forward to a predetermined forward inclined position with the second manipulating member 72 maintained in the state of the second unlocking manipulation is less than the angle (a predetermined restriction angle) corresponding to the first unlocking engaging surface 62, the first pawl engaging projection 46L and the reference point returning projection 63 do not contact each other. The second member 20L and the memory ring 60 thus continuously rotate integrally with each other until the seat back is inclined forward to the predetermined forward inclined position. As a result, the seat back is returned to the memory position when forward inclination of the seat back is canceled in the above-described manner.

In contrast, if the relative rotation amount (angle) of the first pawl engaging projection 46L corresponding to the inclination amount of the seat back that is inclined forward to a predetermined forward inclined position with the second manipulating member 72 maintained in the state of the second unlocking manipulation is greater than the angle (a predetermined restriction angle) corresponding to the first unlocking engaging surface 62, the first pawl engaging projection 46L and the reference point returning projection 63 contact each other. In this case, the memory ring 60 starts to rotate integrally with the first member 10L once the first pawl engaging projection 46L and the reference point returning projection 63 come into contact with each other. Then, until the seat back is inclined forward to the predetermined forward inclined position, the angle between the first locking engaging surface 65 and the first pawl engaging projection 46L is maintained as the angle corresponding to the first unlocking engaging surface 62. When forward inclination of the seat back is canceled, the first member 10L and the second member 20L rotate relative to each other by the angle corresponding to the first unlocking engaging surface 62 such that the first locking engaging surface 65 reaches the first pawl engaging projection 46L of the first pawl 31L. At this stage, the seat back reaches the reference point returning position such that inclination of the seat back can be restricted. That is, when the seat back is inclined forward from a state reclined rearward from a predetermined angular position (the non-seating range) to a predetermined forward inclined position, the inclination of the seat back becomes restricted when forward inclination is canceled and the seat back reaches the reference point returning position. In this manner, the angular position of the seat back is set to the reference point returning position.

Operation of the lock mechanism 5R will now be described.

In the adjustment range (the predetermined angular range) of the seat back, the engaging projections 24R are disengaged from the second locking engaging surfaces 27 such that the outer teeth 43 of the second pawls 31R to 33R are allowed to be meshed with the inner teeth 22. Alternatively, in the adjustment range of the seat back, the engaging projections 24L are disengaged from the first locking engaging surfaces 65 such that the outer teeth 43 of the first pawls 31L to 33L are allowed to be meshed with the inner teeth 22. Thus, by urging the first pawls 31L to 33L and the second pawls 31R to 33R, which operate integrally through the coupling shaft 92, using the spiral springs 35, the outer teeth 43 are meshed with the corresponding inner teeth 22. As a result, at a given angular position in the adjustment range of the seat back, inclination of the seat back relative to the seat cushion is restricted.

In the adjustment range of the seat back, when the first manipulating member 71 is in the state of the first unlocking manipulation, the first pawls 31L to 33L and the second pawls 31R to 33R, which operate integrally through the coupling shaft 92, are retracted radially inward by the corresponding cams 34L, 34R, thus separating the outer teeth 43 from the corresponding inner teeth 22. This permits inclination of the seat back relative to the seat cushion in the adjustment range of the seat back.

In the above-described manner, the seat back can be adjusted and maintained at a given angular position in the adjustment range of the seat back.

When the boundary position between each second unlocking engaging surface 26 and the corresponding second locking engaging surface 27 is arranged at the second pawl engaging projection 46R of the associated second pawl 31R to 33R or reaches the second pawl engaging projection 46R, the boundary position is partially engaged in the radial direction with the second pawl engaging projection 46R, thus restricting movement of the second pawl engaging projection 46R from the second locking engaging surface 27 onto the second unlocking engaging surface 26. Also, relative rotation of the first member 10R, the second pawl engaging projection 46R of which is moved onto the second unlocking engaging surface 26, and the second member 20R is restricted. As a result, forward inclination beyond the adjustment range of the seat back is restricted.

In the adjustment range of the seat back, when the first manipulating member 71 is in the state of the first unlocking manipulation, the boundary position (the restricting surface 66) between the first unlocking engaging surface 62 and the first locking engaging surface 65 of the memory ring 60 is located at the first pawl engaging projection 46L of the first pawl 31L. The boundary position (the restricting surface 66) between the first unlocking engaging surface 62 and the first locking engaging surface 65 of the memory ring 60 thus becomes partially engaged in the radial direction with the first pawl engaging projection 46L, thus restricting movement of the first pawl engaging projection 46L from the first locking engaging surface 65 onto the first unlocking engaging surface 62. The memory ring 60 thus rotates integrally with the first member 10L in a state in which the first member 10R and the second member 20R rotate relative to each other. That is, when the seat back is adjusted to a given angular position in the adjustment range, the first member 10R and the memory ring 60 are rotated integrally with relative to each other.

In contrast, in the adjustment range of the seat back, when the second manipulating member 72 is in the state of the second unlocking manipulation, the first pawls 31L to 33L and the second pawls 31R to 33R, which operate integrally through the coupling shaft 92, are retracted radially inward by the corresponding cams 34L, 34R, thus separating the outer teeth 43 from the corresponding inner teeth 22. This permits inclination of the seat back relative to the seat cushion.

At this time, even if the boundary position between each second unlocking engaging surface 26 and the corresponding second locking engaging surface 27 is located at the second pawl engaging projection 46R of the associated second pawl 31R to 33R or reaches the second pawl engaging projection 46R, the boundary position is disengaged in the radial direction from the second pawl engaging projection 46R, thus permitting movement of the second pawl engaging projection 46R from the second locking engaging surface 27 onto the second unlocking engaging surface 26. This permits forward inclination of the seat back beyond the adjustment range. The outer teeth 43 of the second pawls 31R to 33R, the second pawl engaging projection 46R of which is on the second unlocking engaging surfaces 26, thus cannot be meshed with the corresponding inner teeth 22.

In the adjustment range of the seat back, when the second manipulating member 72 is in the state of the second unlocking manipulation, the memory ring 60 is disengaged in the radial direction from the first pawl engaging projection 46L, thus permitting movement of the first pawl engaging projection 46L from the first locking engaging surface 65 onto the first unlocking engaging surface 62. Also, relative rotation of the first pawl 31L (the first member 10L), the first pawl engaging projection 46L of which is moved onto the first unlocking engaging surface 62, and the memory ring 60 is permitted. Further, the memory ring 60 rotates integrally with the second member 20L through friction engagement between the memory ring 60 and the second member 20L, which is caused by elastic deformation of the memory ring 60. That is, when the second manipulating member 72 is in the state of the second unlocking manipulation, the first member 10L and the memory ring 60 rotate integrally as the seat back is inclined forward from the angular position at the time of the second unlocking manipulation.

At this time, the first pawl 31L, the first pawl engaging projection 46L of which is on the first unlocking engaging surface 62, cannot mesh the outer teeth 43 with the inner teeth 22, together with the first pawls 32L, 33L. The second pawls 31R to 33R, which operate integrally through the coupling shaft 92, cannot mesh the outer teeth 43 with the inner teeth 22 either. That is, when the second manipulating member 72 is in the state of the second unlocking manipulation, the seat back, which is permitted to incline relative to the seat cushion, can be inclined forward beyond the adjustment range while being maintained in the state in which the seat back is permitted to incline relative to the seat cushion.

When the first locking engaging surface 65 reaches the first pawl engaging projection 46L of the first pawl 31L, or, in other words, returns to the memory position, inclination of the seat back, which has been permitted to incline, can be restricted. That is, inclination of the seat back, which has been inclined forward beyond the adjustment range with the second manipulating member 72 maintained in the state of the second unlocking manipulation, is restricted when forward inclination of the seat back is canceled and the seat back is returned to the memory position. This ensures return of the angular position of the seat back to the memory position.

As represented in FIG. 15 in particular, when the second manipulating member 72 is in the state of the second unlocking manipulation, the movement speed of the first pawl 31L in the radial direction when moving the first pawl engaging projection 46L from the first locking engaging surface 65 onto the first unlocking engaging surface 62 is set greater than the movement speed of each second pawl 31R to 33R in the radial direction when moving the second pawl engaging projection 46R from the second locking engaging surface 27 onto the second unlocking engaging surface 26. Therefore, even if the manipulation amount of the second manipulating member 72 when moving the first pawl engaging projection 46L from the first locking engaging surface 65 onto the first unlocking engaging surface 62 is greater than the manipulation amount of the second manipulating member 72 when moving the second pawl engaging projection 46R from the second locking engaging surface 27 onto the second unlocking engaging surface 26 due to, for example, variation in components, the difference between the movement speed of the first pawl 31L and the movement speed of each second pawl 31R to 33R restrains the difference between the times of such movement.

As described above, the present embodiment achieves the following advantages.

(1) As shown in FIG. 5B, in the present embodiment, the engaging projections 24L of the second member 20L (the accommodation recess 23) related to setting of the adjustment range of the seat back and the first pawl engaging projection 46L of the first pawl 31L related to setting of the memory position are arranged to be at least partially overlapped with the position of the memory ring 60 in the axial direction such that the engaging projection 24L and the first pawl engaging projection 46L each can be engaged with the memory ring 60 in the radial direction. This restrains size enlargement in the axial direction compared to a case in which the engaging projections 24L of the second member 20L are located offset from the axial position of the memory ring 60 and the adjustment range of the seat back is set independently from the memory ring 60.

(2) In the present embodiment, when the seat back is inclined forward from a state reclined with respect to the predetermined angular position (in the non-seating range) to a predetermined forward inclined position, the angular position of the seat back is set to the reference point returning position by canceling such forward inclination. As a result, when the second manipulating member 72 is in the state of the second unlocking manipulation and the seat back is inclined forward from a significantly reclined state to a predetermined forward inclined position, return to the significantly reclined state, which is a state unsuitable for a general state of use, is avoided by canceling such forward inclination. That is, by setting the angular position of the seat back to the reference point returning position, discomfort caused by re-adjusting the angular position to a state suitable for a general state of use is decreased.

(3) In the present embodiment, the first unlocking manipulation and the second unlocking manipulation are performed independently from each other by the first manipulating member 71 and the second manipulating member 72, respectively, and erroneous manipulation is restrained. Further, the maximum manipulation amount of the first manipulating member 71, in particular, is set smaller than the manipulation amount necessary for the second unlocking manipulation. This reduces the likelihood that the second unlocking manipulation will be performed even if the first manipulating member 71 is manipulated to the maximum extent.

(4) In the present embodiment, when the seat back is in the seating range and inclined forward to a predetermined forward inclined position, the seat back is returned to the memory position by canceling such forward inclination.

(5) In the present embodiment, even if the manipulation amount of the second manipulating member 72 when moving the first pawl engaging projection 46L from the first locking engaging surface 65 onto the first unlocking engaging surface 62 is greater than the manipulation amount of the second manipulating member 72 when moving the second pawl engaging projection 46R from the second locking engaging surface 27 onto the second unlocking engaging surface 26 due to, for example, variations in components, the difference between the times of such movements are restrained by the difference between the movement speed of the first pawl 31L and the movement speed of each of the second pawls 31L to 33R. This also restrains integral rotation of the memory ring 60 and the second member 20L, that is, setting of the memory position from being hindered even if the second manipulating member 72 is in the state of the second unlocking manipulation and the seat back is inclined forward beyond the adjustment range.

(6) In the present embodiment, the movement amount of the first pawl 31L in the radial direction when moving the first pawl engaging projection 46L from the first locking engaging surface 65 onto the first unlocking engaging surface 62 is set greater than the movement amount of the each second pawl 31R to 33R in the radial direction when moving the second pawl engaging projection 46R from the second locking engaging surface 27 onto the second unlocking engaging surface 26 when the second manipulating member 72 is in the state of the second unlocking manipulation. This reduces the likelihood that the manipulation amount of the second manipulating member 72 when moving the first pawl engaging projection 46L from the first locking engaging surface 65 onto the first unlocking engaging surface 62 will become smaller than the manipulation amount of the second manipulating member 72 when moving the second pawl engaging projection 46R from the second locking engaging surface 27 onto the second unlocking engaging surface 26 due to, for example, variations in components. This restrains forward inclination of the seat back beyond the adjustment range from being hindered even if the memory ring 60 is rotating integrally with the second member 20L, that is, even if the memory position is set with the second manipulating member 72 maintained in the state of the second unlocking manipulation, for example.

(7) In the present embodiment, the operation flow of the first pawl 31L (32L, 33L) and the operation flow of the second pawls 31R to 33R when the second manipulating member 72 is in the state of the second unlocking manipulation are set by means of an extremely simple configuration using the shapes of the first pawl groove cam portions 44L (the inner wall surfaces 44aL) and the shapes of the second pawl groove cam portions 44R (the inner wall surfaces 44aR), respectively.

(8) In the present embodiment, inclination of the seat back relative to the seat cushion in the adjustment range and inclination of the seat back relative to the seat cushion to the predetermined forward inclined position are brought about by the lock mechanisms 5L, 5R, each of which is arranged in a concentrated manner about the axis. This further simplifies the configuration.

(9) In the present embodiment, when the second manipulating member 72 is in the state of the second unlocking manipulation, for example, the stopper link 112, the engaging surface 112b of which is disengaged from the operation restricting surface 102a, is urged by the stopper link urging member 113 to rotate in a manner blocking the rotation path of the movable flange 8L, which corresponds to the reclining direction of the seat back. The reclining of the seat back is thus restricted at the angular position (the predetermined restricting angular position) at which the movable flange 8L comes into contact with the stopper link 112.

(10) In the present embodiment, when the seat back is in the non-seating range (is in a state reclined with respect to the predetermined angular position), or, in other words, when it is assumed that the seat back is already reclined to a certain extent but can be further reclined without a problem, the movable flange 8L stops the stopper link 112 from unnecessarily blocking the rotation path of the movable flange 8L.

(11) In the present embodiment, the engaging surface 112b is caused to contact the operation restricting surface 102a even when the first manipulating member 71 is in the state of the first unlocking manipulation. This causes the stopper link 112, which slidably contacts the operation restricting surface 102a through the engaging surface 112b, to open the rotation path of the movable flange 8L when the first manipulating member 71 is in the state of the first unlocking manipulation. As a result, the stopper link 112 does not restrict inclination of the seat back and thus does not hamper adjustment of the angular position of the seat back in the adjustment range.

(12) In the present embodiment, even if a switch piece (102) is located in the link member 80, a similar stopper mechanism (110) can be configured. That is, the stopper mechanism is configured using the stopper link 112 regardless of with or without a memory function of the lock mechanism.

The above described embodiment may be modified as follows.

Figure 25:
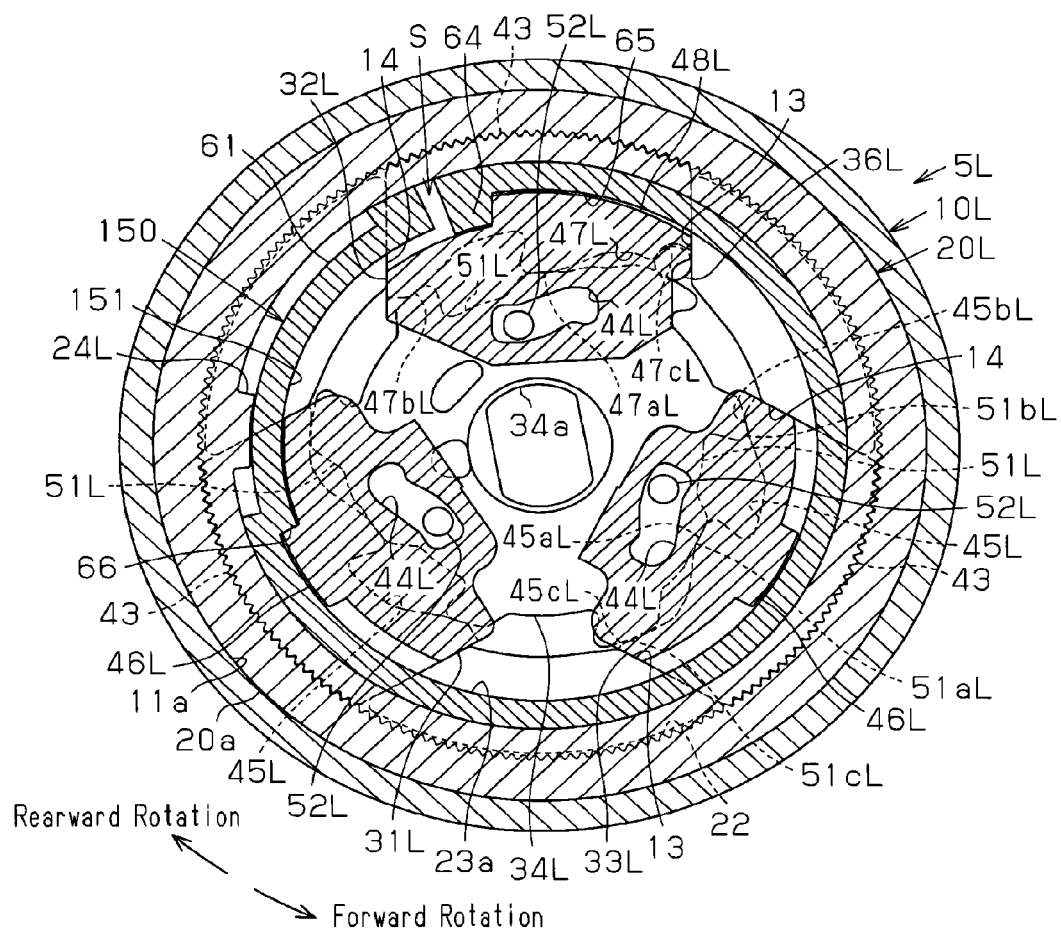
FIG. 25 is a cross-sectional view showing a modification of the present invention.
Figure 26:
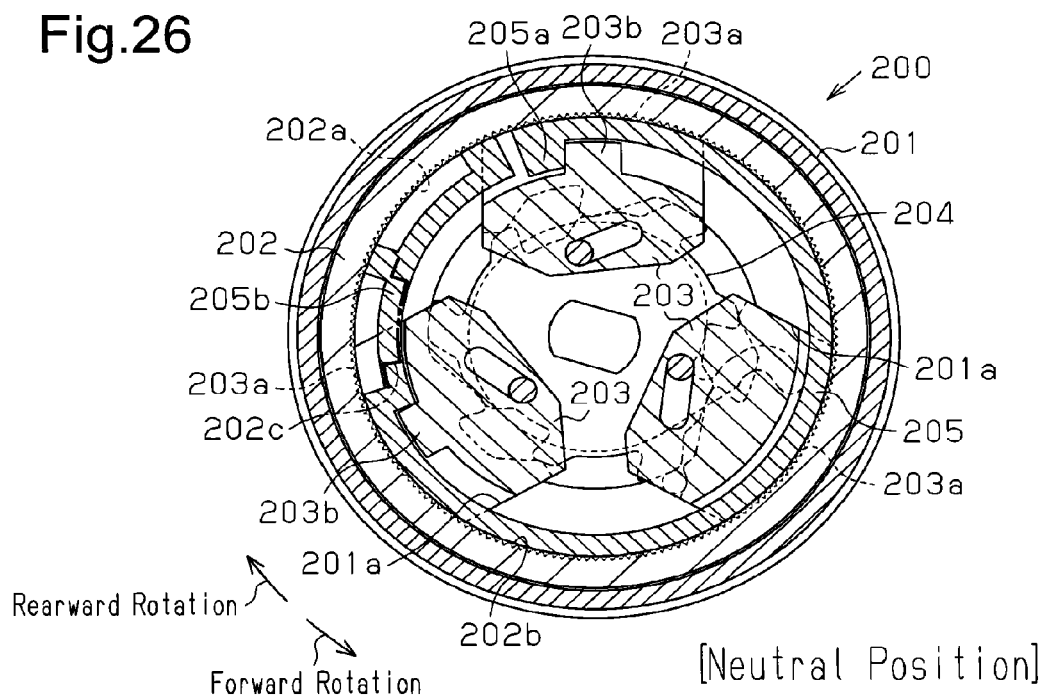
FIG. 26 is a transverse cross-sectional view showing a lock mechanism of a conventional seat reclining device.
Figure 27:
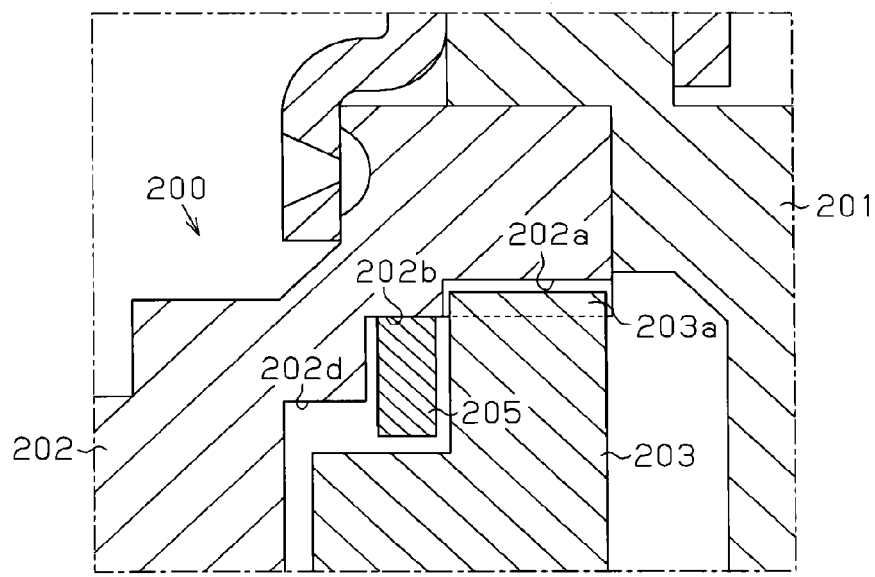
FIG. 27 is a longitudinal cross-sectional view showing the lock mechanism of FIG. 26.

As shown in FIG. 25, a memory ring 150 having a first unlocking engaging surface 151 without a reference point returning projection 63 may be employed. In this case, regardless of the angular position at which the seat back is inclined forward, the first unlocking engaging surface 151 continuously moves relative to the first pawl engaging projection 46L until the seat back reaches the forward inclined position. Then, by raising the seat back to cancel its forward inclination, the second member 20L is rotated rearward together with the memory ring 150. As a result, when the first locking engaging surface 65 reaches the first pawl engaging projection 46L, further rearward rotation of the second member 20L, together with the memory ring 150, is restricted. That is, regardless of the angular position at which the seat back is inclined forward, the seat back is returned to the memory position by canceling such forward inclination.

In the above illustrated embodiment, the reference point returning position brought about by the reference point returning projection 63 of the memory ring 60 may be set as needed by changing the location of the reference point returning projection 63. However, if the angular position of the seat back is located rearward with respect to the reference point returning position, setting of the memory position is hampered. It is thus preferred that the reference point returning position be set rearward with respect to the neutral position, for example.

In the above illustrated embodiment, the reference point returning projection (63) of the memory ring 60 may extend to the distal end (the discontinuous section S) of the memory ring 60.

In the above illustrated embodiment, the memory rings 60, 150 may have an endless annular shape without the discontinuous section S as long as each memory ring 60, 150 is elastically deformable to contract.

In the above illustrated embodiment, the coupling configuration for the first manipulating member 71 and the hinge shaft 91R is illustrated as an example. That is, for example, the first manipulating member 71 may be coupled directly to the hinge shaft 91R.

In the above illustrated embodiment, the coupling configuration for the second manipulating member 72 and the hinge shaft 91L is illustrated as an example. That is, for example, the terminal 75a of the cable 75, which extends from the second manipulating member 72, may be coupled directly to the hinge shaft 91L.

In the above illustrated embodiment, the first manipulating member 71 and the second manipulating member 72 may be coupled to the hinge shaft 91R and the hinge shaft 91L, respectively, in the manners opposite to the illustration.

In the above illustrated embodiment, the restricting angular position of the seat back brought about by the stopper mechanism 110 may be different from the reference point returning position and may be, for example, the neutral position.

In the above illustrated embodiment, the stopper mechanism 110 may be omitted.

In the above illustrated embodiment, the number of the pawls of the lock mechanism 5L may be any suitable number as long as the number is a multiple number. That is, the pawls of the lock mechanism 5L may be employed by a number suitable for a required locking strength or a required full-memory range. Also, the pawls may be shaped either all identical or different from one another. Further, the pawls do not necessarily have to be arranged at equal angular intervals. Additionally, the movement direction of the pawls does not necessarily have to fully coincide with the radial direction of the hinge shaft 91L.

In the above illustrated embodiment, the pawls of the lock mechanism 5R may be arranged by any suitable number and may be employed by a number suitable for a required locking strength. Also, the pawls may be shaped either all identical or different from one another. Further, the pawls do not necessarily have to be arranged at equal angular intervals. Additionally, the movement direction of the pawls does not necessarily have to fully coincide with the radial direction of the hinge shaft 91R.

One of the pawls may be coupled to the cam 34R such that the pawls cooperate with the cam 34R when the cam 34R performs unlocking operation. The other ones of the pawls may be caused to cooperate with the cam 34R though any suitable coupling member when the cam 34R performs the unlocking operation.

In the above illustrated embodiment, the adjustment range of the seat back brought about by the lock mechanism 5R alone may be different from the adjustment range of the seat back brought about by the lock mechanism 5L alone, as long as the adjustment range of the seat back brought about by the lock mechanism 5R alone includes the adjustment range of the seat back brought about by the lock mechanism 5L alone. Even in this case, by operating the lock mechanism 5R in a manner following operation of the lock mechanism 5L, the device as a whole can set the memory position or set the adjustment range in similar manners. However, to ensure strength, it is more preferable to operate the lock mechanisms 5L, 5R (the engaging projections 24L, 24R) together with each other to set the adjustment range.

In the above illustrated embodiment, the lock mechanism 5R may be replaced by a lock mechanism configured in a laterally symmetrical manner with respect to the lock mechanism 5L. That is, the lock mechanism (5L) having a function of setting the adjustment range of the seat back (the engaging projection 24L and the rotation permitting portion 61) and a memory function may be employed as each of opposite lock mechanisms in the lateral direction.

In the above illustrated embodiment, the lower plates 4L, 4R may be provided integrally with the corresponding first members 10L, 10R. Similarly, the two back side frames 6*a* may be provided integrally with the corresponding second members 20L, 20R.

In the above illustrated embodiment, the first member 10L of the lock mechanism 5L and the corresponding seat cushion component (the lower plate 4L) may be fixed in the opposite manner to the illustration. Also, the second member 20L and the corresponding seat cushion component (the back side frame 6*a*) may be fixed in the opposite manner to the illustration. Similarly, the first member 10R of the lock mechanism 5R and the corresponding seat cushion component (the lower plate 4R) may be fixed in the opposite manner to the illustration. Also, the second member 20R and the corresponding seat cushion component (the back side frame 6*a*) may be fixed in the opposite manner to the illustration.

In the above illustrated embodiment, at least one of the two hinge shafts 91L, 91R may be provided integrally with the coupling shaft 92.

In the above illustrated embodiment, one of the first and second manipulating members 71, 72 may be omitted. In this case, by switching the manipulation amount of the single manipulating member, the first and second unlocking operations are performed.

In the above illustrated embodiment, the second manipulating member 72 may be arranged in a rear section of the seat cushion (a section close to the vehicle floor at the side corresponding to a rear passenger seat). In this case, the second manipulating member 72 may be coupled directly to the hinge shaft 91L, for example.

The present invention may be embodied as a vehicle seat device without a walk-in mechanism.

In the above illustrated embodiment, the movement amount of the first pawl 31L in the radial direction when moving the first pawl engaging projection 46L from the first locking engaging surface 65 onto the first unlocking engaging surface 62 may be set substantially equal to or smaller than the movement amount of the second pawl 31R in the radial direction when moving the second pawl engaging projection 46R from the second locking engaging surface 27 onto the second unlocking engaging surface 26 in the state of the second unlocking manipulation.

In the above illustrated embodiment, as in the case of a lock mechanism (210) described in Patent Document 2, for example, the adjustment range of the seat back may be set by engaging the engaging projection 24L of the second member 20L (the accommodation recess 23) with the first pawl engaging projection 46L of the corresponding first pawl 31L to 33L. That is, the engaging projection 24L of the second member 20L (the accommodation recess 23) related to setting of the adjustment range of the seat back and the first pawl engaging projection 46L of the first pawl 31L related to setting of the memory position may be arranged not to be overlapped with the position of the memory ring 60 in the axial direction.

Alternatively, the lock mechanism (5L) with a memory function may be provided without a function of setting the adjustment range of the seat back (the engaging projection 24L or the rotation permitting portion 61).

The invention claimed is:

1. A vehicle seat reclining device comprising a lock mechanism, wherein the lock mechanism includes:
  a first member, which is fixed to one of a seat cushion component and a seat back component and has a guide groove;
  a second member, which is fixed to the other one of the seat cushion component and the seat back component, wherein the second member is rotationally supported by the first member and has inner teeth;
  a first pawl, which is guided by the guide groove of the first member to move in a radial direction and has outer teeth, which are selectively meshed with and separated from the inner teeth of the second member;
  a cam, which is rotationally arranged in the first member, wherein
    when in a state of unlocking operation in which the cam is rotated in one direction, the cam retracts the first pawl inward in the radial direction to separate the outer teeth from the inner teeth, and
    when in a state of locking operation in which the cam is rotated in another direction, the cam presses the first pawl outward in the radial direction to mesh the outer teeth with the inner teeth; and
  an urging member, which urges the cam in a direction in which the locking operation is performed,
  the vehicle seat reclining device comprises:
  a manipulating member, which rotates the cam in a direction in which the unlocking operation is performed against the urging force of the urging member when in a state of unlocking manipulation;
  a memory ring, which is rotationally arranged in an accommodating recess located in the second member to be coaxial with the inner teeth in an elastically contracted state, wherein
    the memory ring has a first unlocking engaging surface located on an inner circumferential surface of the memory ring and a first locking engaging surface located on the inner circumferential surface to be adjacent to the first unlocking engaging surface in a circumferential direction, the first pawl has a first pawl engaging projection, the first unlocking engaging surface becomes engaged with the first pawl engaging projection to prohibit the outer teeth of the first pawl from being meshed with the inner teeth, the first locking engaging surface releases the first pawl engaging projection to allow the outer teeth of the first pawl to be meshed with the inner teeth, at a boundary position between the first unlocking engaging surface and the first locking engaging surface, the memory ring becomes partially engaged in a radial direction with the first pawl engaging projection of the first pawl, which is retracted radially inward when in a state of a first unlocking manipulation as the unlocking manipulation, thereby restricting the first pawl engaging projection from moving onto the first unlocking engaging surface from the first locking engaging surface, the memory ring rotates integrally with the first member and relative to the second member, the memory ring becomes disengaged in the radial direction from the first pawl engaging projection when in a state of a second unlocking manipulation as the unlocking manipulation, thereby permitting the first pawl engaging projection to move onto the first unlocking engaging surface from the first locking engaging surface, and the memory ring rotates integrally with the second member with the first member and the second member maintained in a relative rotation state corresponding to a forward inclination of a seat back;

an engaging projection, which is located in the accommodating recess of the second member to project inward in a radial direction; and a rotation permitting portion, which is located on an outer circumferential surface of the memory ring, and when the rotation permitting portion permits movement of the engaging projection, relative rotation of the second member and the memory ring is permitted in a predetermined rotation range.

2. The vehicle seat reclining device according to claim 1, comprising:

a front stopper mechanism, which restricts forward inclination of the seat back at a predetermined forward inclined position; and a contact projection, which projects radially inward from the first unlocking engaging surface of the memory ring, wherein the contact projection contacts the first pawl engaging projection when the first pawl engaging projection has been moved onto the first unlocking engaging surface in the state of the second unlocking manipulation and is rotated by a predetermined restriction angle in a relative manner as the seat back is inclined forward.

3. The vehicle seat reclining device according to claim 1, wherein the manipulating member is configured by a first manipulating member, which is used in performing the first unlocking manipulation, and a second manipulating member, which is used in performing the second unlocking manipulation, and a maximum manipulation amount of the first manipulating member is set smaller than a manipulation amount necessary for the second unlocking manipulation.

4. The vehicle seat reclining device according to claim 1, wherein the lock mechanism is a first lock mechanism arranged on one side in a seat width direction, the vehicle seat reclining device comprises a second lock mechanism arranged on the opposite side in the seat width direction, the second lock mechanism is configured without the memory ring and includes a first member, a second member, a cam, and a second pawl, which correspond to the first member, the second member, the cam, and the second pawl of the first lock mechanism, respectively, the vehicle seat reclining device comprises a coupling member, which couples the cams of the first and second lock mechanisms to each other such that the cams rotate integrally with each other, the second lock mechanism includes a second unlocking engaging surface, which is located on an inner circumferential surface of the second member and becomes engaged with a second pawl engaging projection arranged in the second pawl in a relative rotation range of the first member and the second member corresponding to forward inclination of the seat back beyond a predetermined angular range, thereby prohibiting the outer teeth of the second pawl from being meshed with the inner teeth, and a second locking engaging surface, which is located on the inner circumferential surface of the second member to be adjacent to the second unlocking engaging surface in a circumferential direction, wherein the second locking engaging surface becomes disengaged from the second pawl engaging projection in a relative rotation range of the first member and the second member corresponding to the predetermined angular range of the seat back, thereby permitting the outer teeth of the second pawl to be meshed with the inner teeth, at a boundary position between the second unlocking engaging surface and the second locking engaging surface, the second lock mechanism becomes partially engaged with the second pawl engaging projection of the second pawl retracted radially inward in the state of the first unlocking manipulation boundary position to restrict the second pawl engaging projection from moving onto the second unlocking engaging surface from the second locking engaging surface, the second lock mechanism becomes disengaged from the second pawl engaging projection in the state of the second unlocking manipulation to permit the second pawl engaging projection to move onto the second unlocking engaging surface from the second locking engaging surface, and in the state of the second unlocking manipulation, a movement speed of the first pawl in a radial direction when the first pawl engaging projection moves onto the first unlocking engaging surface from the first locking engaging surface is set greater than a movement speed of the second pawl in a radial direction when the second pawl engaging projection moves onto the second unlocking engaging surface from the second locking engaging surface.

5. The vehicle seat reclining device according to claim 4, wherein, in the state of the second unlocking manipulation, a movement amount of the first pawl in the radial direction when the first pawl engaging projection moves onto the first unlocking engaging surface from the first locking engaging surface is set substantially equal to or greater than a movement amount of the second pawl in the radial direction when the second pawl engaging projection moves onto the second unlocking engaging surface from the second locking engaging surface.

6. The vehicle seat reclining device according to claim 4, wherein
   each of the cams of the first and second lock mechanisms has an engaging protrusion provided in a projecting manner,
   the first pawl and the second pawl have a first pawl groove cam portion and a second pawl groove cam portion, respectively, wherein each engaging protrusion is received in the corresponding pawl groove cam portions, and
   an operation flow of each of the first and second pawls in the state of the second unlocking manipulation is set in correspondence with the shape of the corresponding one of the first pawl groove cam portion and the second pawl groove cam portion.

7. The vehicle seat reclining device according to claim 3, comprising:
   a stopper link, which is pivotally supported by the seat cushion component;
   a stopper member arranged in the seat back component;
   a release link, which is coupled to the manipulating member and rotates integrally with the cam when in the state of the second unlocking manipulation;
   a first cam surface located in the release link;
   a second cam surface located in the stopper link, wherein
      the second cam surface guides the stopper link to open a rotation path of the stopper member corresponding to a reclining direction of the seat back when the second cam surface contacts the first cam surface with the manipulating member in a non-manipulated state, and
      the second cam surface becomes released from the first cam surface when the second manipulating member is in the state of the second unlocking manipulation, thereby permitting the stopper link to rotate to such a side that the stopper link blocks the rotation path of the stopper member corresponding to the reclining direction of the seat back; and
   an elastic member, which urges the stopper link such that, when the manipulating member is in the non-manipulated state, the first cam surface and the second cam surface contact each other and that the stopper link, the second cam surface of which is released from the first cam surface in the state of the second unlocking manipulation, blocks the rotation path of the stopper member corresponding to the reclining direction of the seat back.

8. The vehicle seat reclining device according to claim 3, comprising:
   a stopper link, which is pivotally supported by the seat cushion component;
   a stopper member arranged in the seat back component;
   a release link, which is coupled to the manipulating member and rotates such that the lock mechanism permits the seat back to incline to the predetermined forward inclined position relative to a seat cushion when in the state of the second unlocking manipulation;
   a first cam surface located in the release link;
   a second cam surface located in the stopper link, wherein
      the second cam surface guides the stopper link to open a rotation path of the stopper member corresponding to a reclining direction of the seat back when the second cam surface contacts the first cam surface with the lock mechanism restricting inclination of the seat back relative to the seat cushion,
      the second cam surface becomes released from the first cam surface when the second manipulating member is in the state of the second unlocking manipulation, thereby permitting the stopper link to rotate to such a side that the stopper link blocks the rotation path of the stopper member corresponding to the reclining direction of the seat back; and
   an elastic member, which urges the stopper link such that, when the lock mechanism restricts inclination of the seat back relative to the seat cushion, the first cam surface and the second cam surface contact each other and that the stopper link, the second cam surface of which is released from the first cam surface in the state of the second unlocking manipulation, blocks the rotation path of the stopper member corresponding to the reclining direction of the seat back.

* * * * *